(12) United States Patent
Nelms et al.

(10) Patent No.: US 9,930,065 B2
(45) Date of Patent: Mar. 27, 2018

(54) MEASURING, CATEGORIZING, AND/OR MITIGATING MALWARE DISTRIBUTION PATHS

(71) Applicants: UNIVERSITY OF GEORGIA RESEARCH FOUNDATION, INC., Athens, GA (US); DAMBALLA, INC., Atlanta, GA (US)

(72) Inventors: Terry Lee Nelms, Dallas, GA (US); Roberto Perdisci, Dacula, GA (US)

(73) Assignees: University of Georgia Research Foundation, Inc., Athens, GA (US); Dambala, Inc., Atlanta, GA (US)

(*) Notice: Subject to any disclaimer, the term of this patent is extended or adjusted under 35 U.S.C. 154(b) by 0 days.

(21) Appl. No.: 14/668,329

(22) Filed: Mar. 25, 2015

(65) Prior Publication Data

US 2016/0285894 A1    Sep. 29, 2016

(51) Int. Cl.
*H04L 29/06* (2006.01)

(52) U.S. Cl.
CPC ........ *H04L 63/145* (2013.01); *H04L 63/1416* (2013.01); *H04L 63/1425* (2013.01)

(58) Field of Classification Search
CPC ............... H04L 63/145; H04L 63/1416; H04L 63/1425
See application file for complete search history.

(56) References Cited

U.S. PATENT DOCUMENTS

| | | | |
|---|---|---|---|
| 4,843,540 A | 6/1989 | Stolfo | |
| 4,860,201 A | 8/1989 | Stolfo et al. | |
| 5,363,473 A | 11/1994 | Stolfo et al. | |
| 5,497,486 A | 3/1996 | Stolfo et al. | |
| 5,563,783 A | 10/1996 | Stolfo et al. | |
| 5,668,897 A | 9/1997 | Stolfo | |
| 5,717,915 A | 2/1998 | Stolfo et al. | |

(Continued)

FOREIGN PATENT DOCUMENTS

| | | |
|---|---|---|
| WO | WO 02/37730 | 5/2002 |
| WO | WO 02/098100 | 12/2002 |
| WO | WO 2007/050244 | 5/2007 |

OTHER PUBLICATIONS

Mekky et al. (Detecting Malicious HTTP Redirections Using Trees of User Browsing Activity, IEEE INFOCOM 2014, pp. 1159-1167).*

(Continued)

*Primary Examiner* — Oleg Korsak
(74) *Attorney, Agent, or Firm* — Pepper Hamilton LLP

(57) ABSTRACT

Systems and methods for event path traceback may utilize a processor and a path traceback and categorization (ATC) module in communication with the processor. The processor may be configured to perform processing associated with receiving network traffic from a network. The ATC module may be configured to perform processing associated with identifying an event within the network traffic, tracing a sequence of network transactions related to the event, and outputting an annotated event path (AMP) including data about the event and the sequence of network transactions related to the event. Performing processing associated with tracing the sequence of network transactions may comprise reconstructing a sequence of transactions within the network traffic that led to the event while filtering out unrelated traffic within the network traffic.

25 Claims, 8 Drawing Sheets

(56) References Cited

U.S. PATENT DOCUMENTS

| | | |
|---|---|---|
| 5,748,780 A | 5/1998 | Stolfo |
| 5,920,848 A | 7/1999 | Schutzer et al. |
| 6,401,118 B1 | 6/2002 | Thomas |
| 6,983,320 B1 | 1/2006 | Thomas et al. |
| 7,013,323 B1 | 3/2006 | Thomas et al. |
| 7,039,721 B1 | 5/2006 | Wu et al. |
| 7,043,759 B2 | 5/2006 | Kaashoek et al. |
| 7,069,249 B2 | 6/2006 | Stolfo et al. |
| 7,093,292 B1 | 8/2006 | Pantuso |
| 7,136,932 B1 | 11/2006 | Schneider |
| 7,152,242 B2 | 12/2006 | Douglas |
| 7,162,741 B2 | 1/2007 | Eskin et al. |
| 7,185,368 B2 | 2/2007 | Copeland, III |
| 7,203,959 B2 | 4/2007 | Nachenberg et al. |
| 7,225,343 B1 | 5/2007 | Honig et al. |
| 7,277,961 B1 | 10/2007 | Smith et al. |
| 7,278,163 B2 | 10/2007 | Banzhof et al. |
| 7,290,283 B2 | 10/2007 | Copeland, III |
| 7,331,060 B1 | 2/2008 | Ricciulli |
| 7,372,809 B2 | 5/2008 | Chen et al. |
| 7,383,577 B2 | 6/2008 | Hrastar et al. |
| 7,424,619 B1 | 9/2008 | Fan et al. |
| 7,426,576 B1 | 9/2008 | Banga et al. |
| 7,448,084 B1 | 11/2008 | Apap et al. |
| 7,475,426 B2 | 1/2009 | Copeland, III |
| 7,483,947 B2 | 1/2009 | Starbuck |
| 7,487,544 B2 | 2/2009 | Schultz et al. |
| 7,512,980 B2 | 3/2009 | Copeland et al. |
| 7,536,360 B2 | 5/2009 | Stolfo et al. |
| 7,549,169 B1 | 6/2009 | Sobel et al. |
| 7,634,808 B1 | 12/2009 | Szor |
| 7,639,714 B2 | 12/2009 | Stolfo et al. |
| 7,644,150 B1 | 1/2010 | Nucci et al. |
| 7,644,151 B2 | 1/2010 | Jerrim et al. |
| 7,657,935 B2 | 2/2010 | Stolfo et al. |
| 7,665,131 B2 | 2/2010 | Goodman et al. |
| 7,698,442 B1 | 4/2010 | Krishnamurthy |
| 7,712,134 B1 | 5/2010 | Nucci et al. |
| 7,752,125 B1 | 7/2010 | Kothari et al. |
| 7,752,665 B1 | 7/2010 | Robertson et al. |
| 7,779,463 B2 | 8/2010 | Stolfo et al. |
| 7,784,097 B1 | 8/2010 | Stolfo et al. |
| 7,818,797 B1 | 10/2010 | Fan et al. |
| 7,882,542 B2 | 2/2011 | Neystadt et al. |
| 7,886,358 B2 | 2/2011 | Copeland, III |
| 7,890,627 B1 | 2/2011 | Thomas |
| 7,895,326 B2 | 2/2011 | Jerrim et al. |
| 7,913,306 B2 | 3/2011 | Apap et al. |
| 7,930,353 B2 | 4/2011 | Chickering |
| 7,962,798 B2 | 6/2011 | Locasto et al. |
| 7,979,907 B2 | 7/2011 | Schultz et al. |
| 7,996,288 B1 | 8/2011 | Stolfo |
| 8,015,414 B2 | 9/2011 | Mahone |
| 8,019,764 B1 | 9/2011 | Nucci |
| 8,065,722 B2 | 11/2011 | Barford et al. |
| 8,074,115 B2 | 12/2011 | Stolfo et al. |
| 8,161,130 B2 | 4/2012 | Stokes |
| 8,170,966 B1 | 5/2012 | Musat et al. |
| 8,180,916 B1 | 5/2012 | Nucci et al. |
| 8,200,761 B1 | 6/2012 | Tevanian |
| 8,224,994 B1 | 7/2012 | Schneider |
| 8,260,914 B1 | 9/2012 | Ranjan |
| 8,341,745 B1 | 12/2012 | Chau |
| 8,347,394 B1 | 1/2013 | Lee |
| 8,402,543 B1 | 3/2013 | Ranjan et al. |
| 8,418,249 B1 | 4/2013 | Nucci et al. |
| 8,484,377 B1 | 7/2013 | Chen et al. |
| 8,516,585 B2 | 8/2013 | Cao et al. |
| 8,527,592 B2 | 9/2013 | Gabe |
| 8,578,497 B2 | 11/2013 | Antonakakis et al. |
| 8,631,489 B2 | 1/2014 | Antonakakis et al. |
| 8,667,583 B2 | 3/2014 | Polyakov et al. |
| 8,826,438 B2 | 9/2014 | Perdisci et al. |
| 8,832,829 B2 | 9/2014 | Manni et al. |
| 9,306,969 B2 | 4/2016 | Dagon et al. |
| 9,516,058 B2 | 12/2016 | Antonakakis et al. |
| 9,525,699 B2 | 12/2016 | Antonakakis et al. |
| 2001/0014093 A1 | 8/2001 | Yoda et al. |
| 2001/0044785 A1 | 11/2001 | Stolfo et al. |
| 2001/0052007 A1 | 12/2001 | Shigezumi |
| 2001/0052016 A1 | 12/2001 | Skene et al. |
| 2001/0055299 A1 | 12/2001 | Kelly |
| 2002/0021703 A1 | 2/2002 | Tsuchiya et al. |
| 2002/0066034 A1 | 5/2002 | Schlossberg et al. |
| 2002/0166063 A1 | 11/2002 | Lachman et al. |
| 2002/0178238 A1 | 11/2002 | Fletcher et al. |
| 2003/0065926 A1 | 4/2003 | Schultz et al. |
| 2003/0065943 A1 | 4/2003 | Geis et al. |
| 2003/0069992 A1 | 4/2003 | Ramig |
| 2003/0145233 A1 | 7/2003 | Poletto et al. |
| 2003/0167402 A1 | 9/2003 | Stolfo et al. |
| 2003/0204621 A1 | 10/2003 | Poletto et al. |
| 2003/0236995 A1 | 12/2003 | Fretwell, Jr. |
| 2004/0002903 A1 | 1/2004 | Stolfo et al. |
| 2004/0039798 A1 | 2/2004 | Hotz et al. |
| 2004/0044791 A1 | 3/2004 | Pouzzner |
| 2004/0088346 A1 | 5/2004 | Hassler et al. |
| 2004/0088348 A1 | 5/2004 | Yeager |
| 2004/0111636 A1 | 6/2004 | Baffes et al. |
| 2004/0181687 A1 | 9/2004 | Nachenberg et al. |
| 2004/0187032 A1 | 9/2004 | Gels et al. |
| 2004/0205474 A1 | 10/2004 | Eskin et al. |
| 2004/0215972 A1 | 10/2004 | Sung et al. |
| 2005/0021848 A1 | 1/2005 | Jorgenson |
| 2005/0036501 A1 | 2/2005 | Chung et al. |
| 2005/0039019 A1 | 2/2005 | Delany |
| 2005/0044406 A1 | 2/2005 | Stute |
| 2005/0050377 A1 | 3/2005 | Chan et al. |
| 2005/0086523 A1 | 4/2005 | Zimmer et al. |
| 2005/0108407 A1 | 5/2005 | Johnson et al. |
| 2005/0108415 A1 | 5/2005 | Turk et al. |
| 2005/0210534 A1 | 9/2005 | Krishnamurthy |
| 2005/0257264 A1 | 11/2005 | Stolfo et al. |
| 2005/0261943 A1 | 11/2005 | Quarterman et al. |
| 2005/0265331 A1 | 12/2005 | Stolfo |
| 2005/0278540 A1 | 12/2005 | Cho |
| 2005/0281291 A1 | 12/2005 | Stolfo et al. |
| 2006/0015630 A1 | 1/2006 | Stolfo et al. |
| 2006/0026682 A1 | 2/2006 | Zakas |
| 2006/0031483 A1 | 2/2006 | Lund |
| 2006/0067240 A1 | 3/2006 | Kim et al. |
| 2006/0068806 A1 | 3/2006 | Nam |
| 2006/0075084 A1 | 4/2006 | Lyon |
| 2006/0078096 A1 | 4/2006 | Poyhonen |
| 2006/0143711 A1 | 6/2006 | Huang et al. |
| 2006/0146816 A1 | 7/2006 | Jain |
| 2006/0150249 A1 | 7/2006 | Gassen et al. |
| 2006/0156402 A1 | 7/2006 | Stone et al. |
| 2006/0168024 A1 | 7/2006 | Mehr |
| 2006/0174345 A1 | 8/2006 | Flanagan et al. |
| 2006/0176822 A1 | 8/2006 | Doyle et al. |
| 2006/0178994 A1 | 8/2006 | Stolfo et al. |
| 2006/0200539 A1 | 9/2006 | Kappler et al. |
| 2006/0212925 A1 | 9/2006 | Shull |
| 2006/0212942 A1 | 9/2006 | Barford et al. |
| 2006/0224677 A1 | 10/2006 | Ishikawa et al. |
| 2006/0230039 A1 | 10/2006 | Shull |
| 2006/0247982 A1 | 11/2006 | Stolfo et al. |
| 2006/0253581 A1 | 11/2006 | Dixon |
| 2006/0253584 A1 | 11/2006 | Dixon |
| 2006/0259967 A1 | 11/2006 | Thomas et al. |
| 2006/0265436 A1 | 11/2006 | Edmond |
| 2006/0288415 A1 | 12/2006 | Wong |
| 2007/0050708 A1 | 3/2007 | Gupta et al. |
| 2007/0056038 A1 | 3/2007 | Lok |
| 2007/0064617 A1 | 3/2007 | Reves |
| 2007/0076606 A1 | 4/2007 | Olesinski |
| 2007/0083931 A1 | 4/2007 | Spiegel |
| 2007/0118669 A1 | 5/2007 | Rand et al. |
| 2007/0136455 A1 | 6/2007 | Lee et al. |
| 2007/0162587 A1 | 7/2007 | Lund et al. |
| 2007/0198679 A1 | 8/2007 | Duyanovich et al. |
| 2007/0209074 A1 | 9/2007 | Coffman |
| 2007/0239999 A1 | 10/2007 | Honig et al. |

(56) References Cited

U.S. PATENT DOCUMENTS

| | | |
|---|---|---|
| 2007/0253377 A1 | 11/2007 | Janneteau et al. |
| 2007/0274312 A1 | 11/2007 | Salmela et al. |
| 2007/0294339 A1 | 12/2007 | Ala-Kleemola et al. |
| 2007/0294419 A1 | 12/2007 | Ulevitch |
| 2008/0005555 A1 | 1/2008 | Lotem et al. |
| 2008/0016570 A1 | 1/2008 | Capalik |
| 2008/0028073 A1 | 1/2008 | Trabe et al. |
| 2008/0028463 A1 | 1/2008 | Dagon |
| 2008/0060054 A1 | 3/2008 | Srivastava |
| 2008/0060071 A1 | 3/2008 | Hennan |
| 2008/0098476 A1 | 4/2008 | Syversen |
| 2008/0133300 A1 | 6/2008 | Jalinous |
| 2008/0155694 A1 | 6/2008 | Kwon et al. |
| 2008/0177736 A1 | 7/2008 | Spangler |
| 2008/0177755 A1 | 7/2008 | Stern et al. |
| 2008/0178293 A1 | 7/2008 | Keen et al. |
| 2008/0184371 A1 | 7/2008 | Moskovitch |
| 2008/0195369 A1 | 8/2008 | Duyanovich et al. |
| 2008/0222729 A1 | 9/2008 | Chen et al. |
| 2008/0229415 A1 | 9/2008 | Kapoor |
| 2008/0262985 A1 | 10/2008 | Cretu et al. |
| 2008/0263659 A1 | 10/2008 | Alme |
| 2008/0276111 A1 | 11/2008 | Jacoby et al. |
| 2009/0055929 A1 | 2/2009 | Lee et al. |
| 2009/0083855 A1 | 3/2009 | Apap et al. |
| 2009/0106304 A1 | 4/2009 | Song |
| 2009/0138590 A1 | 5/2009 | Lee et al. |
| 2009/0171871 A1 | 7/2009 | Zhang et al. |
| 2009/0193293 A1 | 7/2009 | Stolfo et al. |
| 2009/0198997 A1 | 8/2009 | Yeap |
| 2009/0210417 A1 | 8/2009 | Bennett |
| 2009/0222922 A1 | 9/2009 | Sidiroglou et al. |
| 2009/0241190 A1 | 9/2009 | Todd et al. |
| 2009/0241191 A1 | 9/2009 | Keromytis et al. |
| 2009/0254658 A1 | 10/2009 | Kamikura et al. |
| 2009/0254989 A1 | 10/2009 | Achan et al. |
| 2009/0254992 A1 | 10/2009 | Schultz et al. |
| 2009/0265777 A1 | 10/2009 | Scott |
| 2009/0282479 A1 | 11/2009 | Smith et al. |
| 2009/0327487 A1 | 12/2009 | Olson et al. |
| 2010/0011243 A1 | 1/2010 | Locasto et al. |
| 2010/0011420 A1 | 1/2010 | Drako |
| 2010/0017487 A1 | 1/2010 | Patinkin |
| 2010/0023810 A1 | 1/2010 | Stolfo et al. |
| 2010/0031358 A1 | 2/2010 | Elovici et al. |
| 2010/0034109 A1 | 2/2010 | Shomura et al. |
| 2010/0037314 A1 | 2/2010 | Perdisci et al. |
| 2010/0043047 A1 | 2/2010 | Archer et al. |
| 2010/0054278 A1 | 3/2010 | Stolfo et al. |
| 2010/0064368 A1 | 3/2010 | Stolfo et al. |
| 2010/0064369 A1 | 3/2010 | Stolfo et al. |
| 2010/0071068 A1 | 3/2010 | Bauschert et al. |
| 2010/0077481 A1 | 3/2010 | Polyakov et al. |
| 2010/0077483 A1 | 3/2010 | Stolfo et al. |
| 2010/0082758 A1 | 4/2010 | Golan |
| 2010/0138919 A1 | 6/2010 | Peng |
| 2010/0146615 A1 | 6/2010 | Locasto et al. |
| 2010/0153785 A1 | 6/2010 | Keromytis et al. |
| 2010/0169970 A1 | 7/2010 | Stolfo et al. |
| 2010/0235915 A1 | 9/2010 | Memon et al. |
| 2010/0269175 A1 | 10/2010 | Stolfo et al. |
| 2010/0274970 A1 | 10/2010 | Treuhaft et al. |
| 2010/0275263 A1 | 10/2010 | Bennett et al. |
| 2010/0281539 A1 | 11/2010 | Burns et al. |
| 2010/0281541 A1 | 11/2010 | Stolfo et al. |
| 2010/0281542 A1 | 11/2010 | Stolfo et al. |
| 2010/0319069 A1 | 12/2010 | Granstedt |
| 2010/0332680 A1 | 12/2010 | Anderson et al. |
| 2011/0040706 A1 | 2/2011 | Sen et al. |
| 2011/0041179 A1 | 2/2011 | Stahlberg |
| 2011/0055123 A1 | 3/2011 | Kennedy |
| 2011/0067106 A1 | 3/2011 | Evans et al. |
| 2011/0167493 A1 | 7/2011 | Song et al. |
| 2011/0167494 A1 | 7/2011 | Bowen et al. |
| 2011/0185423 A1 | 7/2011 | Sallam |
| 2011/0185428 A1 | 7/2011 | Sallam |
| 2011/0214161 A1 | 9/2011 | Stolfo et al. |
| 2011/0283361 A1 | 11/2011 | Perdisci et al. |
| 2012/0079101 A1 | 3/2012 | Muppala et al. |
| 2012/0084860 A1 | 4/2012 | Cao et al. |
| 2012/0102568 A1 | 4/2012 | Tarbotton et al. |
| 2012/0117641 A1 | 5/2012 | Holloway |
| 2012/0143650 A1 | 6/2012 | Crowley et al. |
| 2012/0151585 A1 | 6/2012 | Lamastra et al. |
| 2012/0198549 A1 | 8/2012 | Antonakakis et al. |
| 2012/0215909 A1 | 8/2012 | Goldfarb et al. |
| 2013/0174253 A1 | 7/2013 | Thomas et al. |
| 2013/0191915 A1 | 7/2013 | Antonakakis et al. |
| 2013/0232574 A1 | 9/2013 | Carothers |
| 2014/0059216 A1 | 2/2014 | Jerrim |
| 2014/0068763 A1 | 3/2014 | Ward et al. |
| 2014/0068775 A1 | 3/2014 | Ward et al. |
| 2014/0075558 A1 | 3/2014 | Ward et al. |
| 2014/0090058 A1 | 3/2014 | Ward et al. |
| 2014/0101759 A1 | 4/2014 | Antonakakis et al. |
| 2014/0157414 A1 | 6/2014 | Antonakakis et al. |
| 2014/0289854 A1 | 9/2014 | Mahvi |
| 2014/0373148 A1 | 12/2014 | Nelms et al. |
| 2015/0026808 A1 | 1/2015 | Perdisci et al. |
| 2015/0222654 A1 | 8/2015 | Crowley et al. |
| 2016/0156660 A1 | 6/2016 | Dagon et al. |

OTHER PUBLICATIONS

Cliff Changchun Zou et al., "Code Red Worm Propagation Modeling and Analysis", In Proceedings of 9th ACM Conference on Computer and Communications Security (CCS '02), Nov. 18, 2002.

Cliff C. Zou et al,. "Email Worm Modeling and Defense", In the 13th ACM International Confrerence on Computer Communications and Networks (CCCN '04), Oct. 27, 2004.

Cliff Changchun Zou et al., "Monitoring and Early Warning for Internet Worms", In Proceedings fo the 10th ACM Conference on Computer and Communications Security (CCS '03), Oct. 2003.

Cliff Changchun Zou et al., "On the Performance of Internet Worm Scanning Strategies", Technical Report TR-03-CSE-07, Umass ECE Dept., Nov. 2003.

Alexander Gostev, "Malware Elovution: Jan.-Mar. 2005", Viruslist. com, http.//www.viruslist.com/en/analysis?pubid=162454316, (Apr. 18, 2005).

Jiang Wu et al., "An Effective Architecture and Algorithm for Detecting Worms with Various Scan Techniques", In Proceedings of the 11th Annual Network and Distributed System Security Symposium (NDSS '04), Feb. 2004.

Matthew M. Williamson et al., "Virus Throttling for Instant Messaging", Virus Bulletin Conference, Sep. 2004, Chicago, IL, USA, (Sep. 2004).

F. Weimer, "Passive DNS Replication", http://www.enyo.de/fw/software/dnslogger, 2005.

Ke Wang et al., "Anomalous Payload-Based Network Intrusion Detection", In Proceedings of the 7th International Symposium on Recent Advances in Intrusion Detection (RAID 2004), 2004.

P. Vixie et al,. "RFC 2136: Dynamic Updates in the Domain Name System (DNS Update)", http://www.faqs.org/rfcs.rfc2136.html (Apr. 1997).

Joe Stewart, "Dipnet/Oddbob Worm Analysis", SecureWorks, http://www.secureworks.com/research/threats/dipnet/ (Jan. 13, 2005).

Harold Thimbleby et al., "A Framework for Modeling Trojans and Computer Virus Infection", Computer Journal, vol. 41, No. 7, pp. 444-458 (1999).

Paul Bachner et al., "Know Your Enemy: Tracking Botnets", http://www.honeynet.org/papers/bots/, (Mar. 13, 2005).

"LockDown Security Bulletin—Sep. 23, 2001", http://lockdowncorp.com/bots/ (Sep. 23, 2001).

Colleen Shannon et al., "The Spread of the Witty Worm", http://www.caida.org/analysis/security/witty/index.xml (Mar. 19, 2004).

Moheeb Abu Rajab et al., "On the Effectiveness of Distributed Worm Monitoring", In Proceedings fo the 14th USENIX Security Symposium (2005).

(56) References Cited

OTHER PUBLICATIONS

Niels Provos, "CITI Technical Report 03-1: A Virtual Honeypot Framework", http://www.citi.umich.edu/techreports/reports/citi-tr-03-1.pdf (Oct. 21, 2003).
"Know your Enemy: Honeynets", http://www.honeypot.org/papers/honeynet, (May 31, 2006).
David Moore et al., "Internet Quarantine: Requirements for Containing Self-Propagating Code", In Proceedings of the IEEE INFOCOM 2003, Mar. 2003.
Joe Stewart, "I-Worm Baba Analysis", http://secureworks.com/research/threats/baba (Oct. 22, 2004.
David Moore et al., "Slammer Worm Dissection: Inside the Slammer Worm", IEEE Security & Privacy, vol. 1, No. 4 (Jul.-Aug. 2003).
David Moore et al., "Code-Red: A Case Study on the Spread and Victims of an Internet Worm", http://www.icir.org/vern/imw-2002/imw2002-papers/209.ps/gz (2002).
Joe Stewart, "Sinit P2P Trojan Analysis", http://www.secureworks.com/research/threats/sinit, (Dec. 8, 2003).
Martin Krzywinski, "Port Knocking—Network Authentication Across Closed Ports", Sys Admin Magazine, vol. 12, pp. 12-17 (2003).
Christopher Kruegel et al., "Anomaly Detection of Web-Based Attacks", In Proceedings of the 10th ACM Conference on Computer and Communication Security (CCS '03), Oct. 27-31, 2003, Washington, DC, USA, pp. 251-261.
"Dabber Worm Analysis", LURHQ Threat Intelligence Group, http://www.lurhq.com/dabber.html (May 13, 2004).
Abstract of Jeffrey O. Kephart et al,. "Directed-Graph Epidemiological Models of Computer Viruses", Proceedings of the 1991 IEEE Computer Society Symposium on Research in Security and Privacy; Oakland, CA, May 20-22, 1991; pp. 343-359 (May 20-22, 1991).
C. Kalt "RFC 2810—Internet Relay Chat: Architecture" http://faqs.org/rfcs/rfc2810.html (Apr. 2000).
Xuxian Jiang et al., "Cerias Tech Report 2005-24: Virtual Playgrounds for Worm Behavior Investigation", Purdue University, Feb. 2005.
Neal Hindocha et al., "Malicious Threats and Vulnerabilities in Instant Messaging", Virus Bulletin International Conference, Sep. 2003.
Thomer M. Gil, "NSTX (IP-over-DNS) HOWTO", http://thomer.com/howtos/nstx.html, Nov. 4, 2005 (5 pages).
V. Fuller et al., "RFC 1519—Classless Inter-Domain Routing (CIDR): An Address Assignment and Aggregation Strategy", http://www.faqs.org/rfcs/rfc1519.html (Sep. 1993).
David E. Smith "Dynamic DNS", http://www.technopagan.org/dynamic (Aug. 7, 2006).
Dave Dittrich, "Active Response Continuum Research Project", http://staff.washington.edu/dittrich/arc/ (Nov. 14, 2005).
Joe Stewart, "Akak Trojan Analysis", http://www.secureworks.com/research/threats/akak/ (Aug. 31, 2004).
Monirul I. Sharif, "Mechanisms of Dynamic Analysis and DSTRACE".
Kapil Kumar Singh, "IRC Reconnaissance (IRCRecon) Public IRC Heuristics (BotSniffer)" (Jul. 24, 2006).
http://www.trendmicro.com/en/home/us/home.htm.
"InterCloud Security Service", http://www.trendmicro.com/en/products/nss/icss/evaluate/overview.html (2006) (2 pages).
"2006 Press Releases: Trend Micro Takes Unprecedented Approach to Eliminating Botnet Threats with the Unveiling of InterCloud Security Service", http://www.trendmicro.com/en/about/news/pr/archive/2006/pr092506.htm, (Sep. 25, 2006).
Paul F. Roberts, "Trend Micro Launches Anti-Botnet Service", InfoWorld, http://www.infoworld.com/article/06/09/25/HNtrendintercloud_1.html (Sep. 25, 2006).
CNN Technology News—Expert: Botnets No. 1 Emerging Internet Threat, CNN.com, http://www.cnn.com/2006/TECH/internet/01/31/furst.index.html (Jan. 31, 2006).
Evan Cooke et al., "The Zombie Roundup: Understanding, Detecting, and Disrupting Botnets", In USENIX Workshop on Steps to Reducing Unwanted Traffic on the Internet (SRUTI), Jun. 2005.
Sven Dietrich et al., "Analyzing Distributed Denial of Service Tools: The Shaft Case", Proceedings of the 14th Systems Administration Conference (LISA 2000), New Orleans, Louisiana, USA, Dec. 3-8, 2000.
Felix C. Freiling et al,. "Botnet Tracking: Exploring a Root-Cause Methodology to Prevent Distributed Denial-of-Service Attacks", ESORICS 2005, LNCS 3679, pp. 319-335 (2005).
Luiz Henrique Gomes et al,. "Characterizing a Spam Traffic", In Proc. ACM SIGCOMM Internet Measurement Conference (IMC '04), Oct. 25-27, 2004 Taormina, Sicily, Italy, pp. 356-369.
Christopher W. Hanna, "Using Snort to Detect Rogue IRC Bot Programs", Technical Report, SANS Institute 2004 (Oct. 8, 2004).
Jaeyeon Jung et al., "An Empirical Study of Spam Traffic and the Use of DNS Black Lists", In Proc. ACM SIGCOMM Internet Measurement Conference (IMC '04), Oct. 25-27, 2004, Taormina, Sicily, Italy, pp. 370-375.
Srikanth Kandula et al., "Botz-4-Sale: Surviving Organized DDoS Attacks That Mimic Flash Crowds", Technical Report LCS TR-969, Laboratory for Computer Science, MIT, 2004.
Sven Krasser et al., "Real-Time and Forensic Network Data Analysis Using Animated and Coordinated Visualization", Proceedings of the 6th IEEE Information Assurance Workshop (Jun. 2005).
David Moore et al., "Inferring Internet Denial-of-Service Activity", In Proceedings of the 2001 USENIX Security Symposium, 2001.
Stephane Racine, "Master's Thesis: Analysis for Internet Relay Chat Usage by DDoS Zombies", ftp://www.tik.ee.ethz.ch/pub/students/2003-2004-Wi/MA-2004-01.pdf (Nov. 3, 2003).
Anirudh Ramachandran et al., "Understanding the Network-Level Behavior of Spammers", SIGCOMM '06, Sep. 11-15, 2006, Pisa, Italy, pp. 291-302.
Ramneek Puri, "Bots & Botnet: An Overview", SANS Institute 2003, http://www.giac.com/practical/GSEC/Ramneek_Puri_GSEC.pdf (Aug. 8, 2003).
Stuart E. Schechter et al., "Access for Sale: A New Class of Worm", In 2003 ACM Workshop on Rapid Malcode (WORM '03), ACM SIGSAC, Oct. 27, 2003, Washington, DC, USA.
Stuart Staniford, "How to Own the Internet in Your Spare Time", In Proc. 11th USENIX Security Symposium, San Francisco, CA, Aug. 2002.
Martin Overton, "Bots and Botnets: Risks, Issues and Prevention", 2005 Virus Bulletin Conference at the Burlington, Dublin, Ireland, Oct. 5-7, 2005, http://arachnid.homeip.net/papers/VB2005-Bots_and_Botnets-1.0.2.pdf.
Yin Zhang et al., "Detecting Stepping Stones", Proceedings of the 9th USENIX Security Symposium, Denver, Colorado, USA, Aug. 14-17, 2000.
Joe Stewart, "Bobax Trojan Analysis", http://www.lurhq.com/bobax.html, May 17, 2004.
David Brumley et al., "Tracking Hackers on IRC", http://www.doomded.com/texts/ircmirc/TrackingHackersonIRC.htm, Dec. 8, 1999.
Brian Krebs, "Bringing Botnets Out of the Shadows", Washingtonpost.com, http://www.washingtonpost.com/wp-dyn/content/artcile/2006/03/21/AR2006032100279_pf.html, Mar. 21, 2006.
"SwatIT: Bots, Drones, Zombies, Worms and Other Things That Go Bump in the Night", http://swatit.org/bots, 2004.
Christian Kreibich, "Honeycomb: Automated NIDS Signature Creation Using Honeypots", 2003, http://www.cl.cam.ac.uk/research/srg/netos/papers/2003-honeycomb-sigcomm-poster.pdf.
DMOZ Open Directory Project, Dynamic DNS Providers List, http://dmoz.org/Computers/Software/Internet/Servers/Address_Management/Dynamic_DNS_Services/, Mar. 19, 2007 (3 pages).
David Moore, "Network Telescopes: Observing Small or Distant Security Events", http://www.caida.org/publications/presentations/2002/usenix_sec/usenix_sec_2002_files/frame.htm; Aug. 8, 2002.

(56) References Cited

OTHER PUBLICATIONS

Vincent H. Berk et al., "Using Sensor Networks and Data Fusion for Early Detection of Active Worms", Sensors, and Command, Control, Communications, and Intelligence (C3iI) Technologies for Homeland Defense and Law Enforcement II, Proceedings of SPIE, vol. 5071, pp. 92-104 (2003).
David Dagon et al., "Worm Population Control Through Periodic Response", Technical Report, Georgia Institute for Technology, Jun. 2004.
Scott Jones et al., "The IPM Model of Computer Virus Management", Computers & Security, vol. 9, pp. 411-418 (1990).
Jeffrey O. Kephart et al., "Directed-Graph Epidemiological Models of Computer Viruses", In Proceedings of IEEE Symposium on Security and Privacy, pp. 343-359 (1991).
Darrell M. Kienzle et al., "Recent Worms: A Survey and Trends", In WORM '03, Proceedings of the 2003 ACM Workshop on Rapid Malcode, Washington, DC, USA, pp. 1-10, Oct. 27, 2003.
Bill McCarty, "Botnets: Big and Bigger", IEEE Security and Privacy Magazine, vol. 1, pp. 87-89 (2003).
Xinzhou Qin et al., "Worm Detection Using Local Networks", Technical Report GIT-CC-04-04, College of Computing, Georgia Institute of Technology, Feb. 2004.
Yang Wang et al., "Modeling the Effects of Timing Parameters on Virus Propagation", In Proceedings of ACM CCS Workshop on Rapid Malcode (WORM '03), Washington, DC, pp. 61-66, Oct. 27, 2003.
Donald J. Welch et al., "Strike Back: Offensive Actions in Information Warfare", in AMC New Security Paradigm Workshop, pp. 47-52 (1999).
T. Liston, "Welcome to my Tarpit: The Tactical and Strategic Use of LaBrea", http://www.hackbusters.net/LaBrea/LaBrea.txt, Oct. 24, 2001.
R. Pointer, "Eggdrop Development", http://www.eggheads.org, Oct. 1, 2005.
S. Staniford, "Code Red Analysis Pages July Infestation Analysis", http://silicondefense.org/cr/july.html, Nov. 18, 2001.
Alex Ma, "NetGeo—The Internet Geographic Database", http://www.caida.org/tools/utilities/netgeo/index.xml, Sep. 6, 2006.
MathWorks Inc. Simulink, http://www.mathworks.com/products/simulink, Dec. 31, 2005.
David Dagon et al., "Modeling Botnet Propagation Using Time Zones", In Proceedings of the 13th Annual Network and Distributed Systems Security Symposium (NDSS '06), Feb. 2006.
John Canavan, "Symantec Security Response: W32.Bobax.D", http://www.sarc.com/avcent/venc/data/w32.bobax.d.html, May 26, 2004.
"Whois Privacy", www.gnso.icann.org/issues/whois-privacy/index/shtml, Jun. 3, 2005.
John D. Hardin, "The Scanner Tarpit HOWTO", http://www.impsec.org/linus/security/scanner-tarpit.html, Jul. 20, 2002.
Charles J. Krebs, "Ecological Methodology", Harper & Row, Publishers, New York, pp. v-x, 15-37, 155-166, and 190-194 (1989).
D.J. Daley et al., "Epidemic Modeling: An Introduction", Cambridge University Press, pp. vii-ix, 7-15, and 27-38 (1999).
Lance Spitzner, "Honeypots: Tracking Hackers", Addison-Wesley, pp. vii-xiv, 73-139, 141-166, and 229-276 (2003).
International Search Report issued in Application No. PCT/US06/038611 dated Jul. 8, 2008.
Written Opinion issued in Application No. PCT/US06/038611 dated Jul. 8, 2008.
International Preliminary Report on Patentability issued in Application No. PCT/US06/038611 dated Mar. 26, 2009.
O. Diekmann et al,. "Mathematical Epidemiology of Infectious Diseases: Model Building, Analysis and Interpretation", John Wiley & Son, Ltd., 2000, pp. v-xv and 1-303.
Jelena Mirkovic et al,. "Internet Denial of Service: Attack and Defense Mechanisms", Prentice Hall Professional Technical Reference, 2004, pp. v-xxii and 1-372.
"Symantec Internet Security Threat Report: Trends for Jan. 1, 2004-Jun. 30, 2004" Symantec, Sep. 2004, pp. 1-54.
David Dagon et al., "HoneyStat: Local Worm Detection Using Honeypots", RAID 2004, LNCS 3224, pp. 39-58 (2004).
Jonghyun Kim et al., "Measurement and Analysis of Worm Propagation on Internet Network Topology", IEEE, pp. 495-500 (2004).
Andreas Marx, "Outbreak Response Times: Putting AV to the Test", www.virusbtn.com, Feb. 2004, pp. 4-6.
Vinod Yegneswaran et al., "Global Intrusion Detection in the DOMINO Overlay System", Proceedings of Network and Distributed Security Symposium (NDSS), 17 pages Feb. 2004.
Vinod Yegneswaran et al., "On the Design and Use of Internet Sinks for Network Abuse Monitoring", RAID 2004, LNCS 3224, pp. 146-165 (2004).
Cliff Changchun Zou et al., "Worm Propagation Modeling and Analysis Under Dynamic Quarantine Defense", WORM'03, Oct. 27, 2003, Washington, DC USA, 10 pages.
Cliff C. Zou et al., "Routing Worm: A Fast, Selective Attack Worm Based on IP Address Information", Technical Report: TR-03-CSE-06, Principles of Advanced and Distributed Simulation (PADS) 2005, pp. 199-206, Jun. 1-3, 2005.
Thorsten Holz, "Anti-Honeypot Technology", 21st Chaos Communication Congress, slides 1-57, Dec. 2004.
"CipherTrust's Zombie Stats", http://www.ciphertrust.com/resources/statistics/zombie.php 3 pages, printed Mar. 25, 2009.
Joe Stewart, "Phatbot Trojan Analysis", http://www.secureworks.com/research/threats/phatbot, Mar. 15, 2004, 3 pages.
Thorsten Holz et al., "A Short Visit to the Bot Zoo", IEEE Security & Privacy, pp. 7679 (2005).
Michael Glenn, "A Summary of DoS/DDoS Prevention, Monitoring and Mitigation Techniques in a Service Provider Environment", SANS Institute 2003, Aug. 21, 2003, pp. ii-iv, and 1-30.
Dennis Fisher, "Thwarting the Zombies", Mar. 31, 2003, 2 pages.
Dongeun Kim et al., "Request Rate Adaptive Dispatching Architecture for Scalable Internet Server", Proceedings of the IEEE International Conference on Cluster Computing (CLUSTER'00); pp. 289-296 (2000).
Keisuke Ishibashi et al., "Detecting Mass-Mailing Worm Infected Hosts by Mining DNS Traffic Data", SIGCOMM'05 Workshops, pp. 159-164 (Aug. 22-26, 2005).
Nicholas Weaver et al., "A Taxonomy of Computer Worms", WORM'03, pp. 11-18 (Oct. 27, 2003).
Stephan Axelsson, "The Base-Rate Fallacy and the Difficulty of Intrusion Detection", ACM Transactions on Information and System Security, vol. 3, No. 3, pp. 186-205 (Aug. 2000).
Neil Landwehr et al., "Logistic Model Trees", Machine Learning, vol. 59, pp. 161-205 (2005).
Richard O. Duda et al., "Pattern Classification, Second Edition", John Wiley & Sons, Inc., pp. vii-xx, and 1-654, Copyright 2001.
Guofei Gu et al. "BotMiner: Clustering Analysis of Network Traffic Protocol- and Structure-Independent Botnet Detection", 2008, USENIX Security Symposium, pp. 139-154.
Zhu et al., "Using Failure Information Analysis to Detect Enterprise Zombies," Lecture note of the Institute for Computer Science, Social-Informatics and Telecommunications Engineering, vol. 19, part 4, pp. 185-206, 2009.
Manos Antonakakis et al., "Building a Dynamic Reputation System for DNS", 19th USENIX Security Symposium, Aug. 11-13, 2010 (17 pages).
Manos Antonakakis et al., "Detecting Malware Domains at the Upper DNS Hierarchy", In Proceeding of the 20th USENIX Security Symposium, Aug. 8-12, 2011 (16 pages).
Leyla Bilge et al., "EXPOSURE: Finding Malicious Domains Using Passive DNS Analysis", 18th Annual Network and Distributed System Security Symposium, Feb. 6-9, 2011 (17 pages).
"Virus:Win32/Expiro.Z". http://www.microsoft.com/security/portal/Threat/Encyclopedia/Entry.aspx, Jun. 9, 2011 (5pages).
Mike Geide, "Another Trojan Bamital Pattern", http://research.zscaler.com/2011/05/another-trojan-bamital-pattern.html, May 6, 2011 (5 pages).
Sergey Golovanov et al., "TDL4—Top Bot", http://www.secuirlist.com/en/analysis/204792180/TDL4_Top_Bot, Jun. 27, 2011 (15 pages).

(56) References Cited

OTHER PUBLICATIONS

P. Mockapetris, "Domain Names—Concepts and Facilities", Network Working Group, http://www.ietf.org/rfc/rfc1034.txt, Nov. 1987 (52 pages).
P. Mockapetris, "Domain Names—Implementation and Specification", Network Working Group, http://www.ietf.org/rfc/rfc1035.txt, Nov. 1987 (52 pages).
Phillip Porras et al. "SRI International Technical Report: An Analysis of Conficker's Logic and Rendezvous Points", http://mtc.sri.com/Conficker/, Mar. 19, 2009, (31 pages).
Phillip Porras et al. "SRI International Technical Report: Conficker C Analysis", http://mtc.sri.com/Conficker/addendumC, Apr. 4, 2009, (24 pages).
Paul Royal, Damballa, "Analysis of the Kracken Botnet", Apr. 9, 2008 (13 pages).
Sergei Shevchenko, "Srizbi's Domain Calculator", http://blog.threatexpert.com/2008/11/srizbix-domain-calculator.html, Nov. 28, 2008 (3 pages).
Sergei Shevchenko, "Domain Name Generator for Murofet", http://blog.threatexpert.com/2010/10/domain-name-generator-for-murofet.html, Oct. 14, 2010 (4 pages).
P Akritidis et al., "Efficient Content-Based Detection of Zero-Day Worms", 2005 IEEE International Conference in communications, vol. 2, pp. 837-843, May 2005.
M. Patrick Collins et al., "Hit-List Worm Detection and Bot Identification in Large Networks Using Protocol Graphs", RAID 2007, LNCS 4637, pp. 276-295 (2007).
Nicholas Weaver et al., "Very Fast Containment of Scanning Worms", In proceedings of the 13th USENIX Security Symposium, pp. 29-44, Aug. 9-13, 2004.
David Whyte et al., "DNS-Based Detection of Scanning Worms in an Enterprise Network", In Proc. of the 12th Annual Network and Distributed System Security Symposium, pp. 181-195, Feb. 3-4, 2005.
Cristian Abad et al., "Log Correlation for Intrusion Detection: A Proof of Concept", In Proceedings of the 19th Annual Computer Security Application Conference (ACSAC'03), (11 pages) (2003).
Lala A. Adamic et al., "Zipf's Law and the Internet", Glottometrics, vol. 3, pp. 143-150 (2002).
K.G. Anagnostakis et al., "Detecting Targeted Attacks Using Shadow Honeypots", In Proceedings of the 14th USENX Secuirty Symposium, pp. 129-144 (2005).
Paul Baecher et al., "The Nepenthes Platform: An Efficient Approach to Collect Malware", In Proceedings of Recent Advances in Intrusion Detection (RAID 2006), LNCS 4219, pp. 165-184, Sep. 2006.
Paul Barford et al., "An Inside Look at Botnets", Special Workshop on Malware Detection, Advances in Information Security, Spring Verlag, pp. 171-192 (2006).
James R. Binkley et al., "An Algorithm for Anomaly-Based Botnet Detection", 2nd Workshop on Steps to Reducing Unwanted Traffic on the Internet (SRUTI '06), pp. 43-48, Jul. 7, 2006.
Steven Cheung et al., "Modeling Multistep Cyber Attacks for Scenario Recognition", In Proceedings of the Third DARPA Information Survivability Conference and Exposition (DISCEX III), vol. 1, pp. 284-292, Apr. 22-24, 2003.
Evan Cooke et al., "The Zombie Roundup: Understanding, Detecting, and Disrupting Botnets", Steps to Reducing Unwanted Traffic on the Internet Workshop (SRUTI '05), pp. 39-44, Jul. 7, 2005.
Frederic Cuppens et al., "Alert Correlation in a Cooperative Intrusion Detection Framework", In Proceedings of IEEE Symposium on Security and Privacy 2002, pp. 202-215 (2002).
David Dagon et al., "Modeling Botnet Propagation using Time Zones", The 13th Annual Network and Distributed System Security Symposium 2006, Feb. 2-3, 2006 (18 pages).
Roger Dingledine et al., "Tor: The Second-Generation Onion Router", In Proceedings of the 13th Usenix Security Symposium, pp. 303-320 Aug. 9-13, 2004.

Steven T. Eckman et al., "STATL: An Attack Language for State-Based Intrusion Detection", Journal of Computer Security, vol. 10, pp. 71-103 (2002).
Daniel R. Ellis, et al., "A Behavioral Approach to Worm Detection", WORM'04, Oct. 29, 2004 (11 pages).
Prahlad Fogla et al., "Polymorphic Blending Attacks", In Proceedings of 15th Usenix Security Symposium, pp. 241-256, (2006).
Jan Goebel, "Rishi: Identify Bot Contaminated Hosts by IRC Nickname Evaluation", Hot Bots'07, Apr. 10, 2007 (14 pages).
Koral Ilgun et al., "State transition Analysis: A Rule-Based Intrusion Detection Approach", IEEE Transactions on Software Engineering, vol. 21, No. 3, pp. 181-199, Mar. 1995.
Xuxian Jiang et al., "Profiling Self-Propagating Worms Via Behavioral Footprinting", WORM'06, Nov. 3, 2006 (7 pages).
Giovanni Vigna et al., "NetSTAT: A Network-based Intrusion Detection Approach", In Proceedings of the 14th Annual Computer Security Applications Conference (ACSAC '98), pp. 25-34, Dec. 7-11, 1998.
Kelly Jackson Higgins, "Shadowserver to Build 'Sinkhole' Server to Find Errant Bots: new Initiative Will Emulate IRC, HTTP Botnet Traffic", http://darkreading.com/taxonomy/index/printarticle/id/211201241. Sep. 24, 2008 (2 pages).
Kelly Jackson Higgins, "Hacking a New DNS Attack: DNS Expert Disputes Georgia Tach and Google Research That Points to Malicious Deployment of Certain Types of DNS Servers", http://darkreading.com/taxonomy/index/printarticle/id/208803784. Dec. 18, 2007 (2 pages).
Christian Kreibich, "Honeycomb: Automated Signature Creation Using Honeypots", http://www.icir.org/christain/honeycomb/index.html, Mar. 26, 2007, (3 pages).
Artem Dinaburg et al., "Ether: Malware Analysis Via Hardware Virtualization Extensions", CCS'08, Oct. 27-31, 2008 (12 pages).
Paul Royal, "Alternative Medicine: The Malware Analyst's Blue Pill", Black Hat USA 2008, Aug. 6, 2008 (33 pages).
Paul Royal, "Alternative Medicine: The Malware Analyst's Blue Pill", www.damballa.com/downloads/r_pubs/KrakenWhitepaper.pdf (2008) (3pages).
Robert Perdisci et al., "Behavioral Clustering of HTTP-Based Malware and Signature Generation Using Malicious Network Traces", Usenix Symposium on Networked Systems Design and Implementation (NSDI 2010), (2010) (16 Pages).
Christopher Kruegel et al., "Polymorphic Worm Detection using Structural Information of Executables", RAID 2005, pp. 207-226 (2005).
Paul Vixie, "DNS Complexity", ACM Queue, pp. 24-29, Apr. 2007.
Ke Wang et al., "Anagram: A Content Anomaly Detector Resistant to Mimicry Attack", In Proceedings of the International Symposium on Recent Advances in Intrusion Detection (RAID) (2006) (20 pages).
Ke Wang et al., "Anomalous Payload-Based Worm Detection and Signature Generation", In Proceedings of the International Symposium on Recent Advances in Intrusion Detection (RAID) (2005) (20 pages).
David Whyte, "Exposure Maps: Removing Reliance on Attribution During Scan Detection", 1st Usenix Workshop on Hot Topics in Security, pp. 51-55 (2006).
Jiahai Yang et al., "CARDS: A Distributed System for Detecting Coordinated Attacks", In Sec (2000) (10 pages).
Vinod Yegneswaran et al., "Using Honeynets for Internet Situational Awareness", In proceedings of the Fourth Workshop on Hot Topics in Networks (HotNets IV), Nov. 2005 (6 pages).
David Dagon et al., "Corrupted DNS Resolution Paths: The Rise of a Malicious Resolution Authority", In Proceedings of Network and Distributed Security Symposium (NDSS '08) (2008) (15 pages).
Dihe's IP-Index Browser, http://ipindex.homelinux.net/index.php, updated Oct. 13, 2012 (1 page).
Shuang Hao et al., "An Internet-Wide View into DNS Lookup Patterns", http://labs.verisign.com/projects/malicious-domain-names/white-paper/dns-imc2010.pdf (2010) (6 pages).
Thorsten Holz et al., "Measuring and Detecting Fast-Flux Service Networks", In Proceedings of NDSS (2008) (12 pages).

(56) References Cited

OTHER PUBLICATIONS

Jaeyeon Jung et al., "DNS Performance and the Effectiveness of Caching", IEEE/ACM Transactions on Networking, vol. 10, No. 5, pp. 589-603, Oct. 2002.
The Honeynet Project & Research Alliance, "Know Your Enemy: Fast-Flux Service Networks: An Ever Changing Enemy", http://old.honeynet.org/papers/ff/fast-flux.html, Jul. 13, 2007 (10 pages).
Duane Wessels et al., "Measurements and Laboratory Simulations of the Upper DNS Hierarchy", In PAM (2005) (10 pages).
Joe Stewart, "Top Spam Botnets Exposed", http://www.secureworks.com/cyber-threat-intelligence/threats/topbotnets/, Apr. 8, 2008 (11 pages).
Brett Stone-Gross et al., "Your Botnet is My Botnet: Analysis of a Botnet Takeover", CCS'09, Nov. 9-13, 2009 (13 pages).
Sam Stover et al., "Analysis of the Storm and Nugache Trojans: P2P is here", Login, vol. 32, No. 6, pp. 18-27, Dec. 2007.
"Storm Botnet", http://en.wikipedia.org/wiki/Storm_botnet, Printed Jan. 29, 2013 (7 pages).
Jeff Williams, "What We Know (and Learn) for the Waledac Takedown", http://blogs.technet.com/b/mmpc/archive/2010/03/15/what-we-know-and-learned-from-the-waledac-takedown.aspx, Mar. 15, 2010 (2 pages).
"Trojan:Java/Boonan", http://microsoft.com/security/portal/threat/encyclopedia/entry.aspx?Name=Trojan%3AJava%2FBoonan, Apr. 17, 2011 (5 pages).
Julia Wolf, "Technical Details of Srizbi's Domain Generation Algorithm", http://blog.fireeye.com/research/2008/11/technical-details-of-srizbis-domain-generation-algorithm.html, Nov. 25, 2008 (4 pages).
Sandeep Yadav et al., "Detecting Algorithmically Generated Malicious Domain Names", In Proceedings of the 10th Annual Conference on Internet Measurement (IMC'10), pp. 48-61, Nov. 1-3, 2010.
"TEMU: The BitBlaze Dynamic Analysis Component", http://bitblaze.cs.berkeley.edu/temu.html, printed Jan. 29, 2013 (1 page).
Paul Bacher et al., "Know Your Enemy: Tracking Botnets: Using Honeynets to Learn More About Bots", http://www.honeynet.org/papers/bots, Aug. 10, 2008 (1 page).
Michael Bailey et al., "Automated Classification and Analysis of Internet Malware", RAID 2007, LNCS 4637, pp. 178-197 (2007).
Paul Barham et al., "Xen and the Art of Virtualization", SOSP'03, Oct. 19-22, 2003 (14 pages).
Ulrich Bayer et al., "TTAnalyze: A Tool for Analyzing Malware", In Proceedings of the 15th Annual Conference European Institute for Computer Antivirus Research (EICAR), pp. 180-192 (2006).
Fabrice Bellard, "QEMU, A Fast and Portable Dynamic Translator", In Proceedings of the Annual Confernce on Usenix Annual Technical Conference, pp. 41-46 (2005).
Kevin Borders et al., "Siren: Catching Evasive Malware (Short Paper)", IEEE Symposium on Security and Privacy, pp. 78-85, May 21-24, 2006.
Christopher M. Bishop, Pattern Recognition and Machine Learning (Information Science and Statistics), Springer-Verlag New York, Inc., Secauscus, NJ, USA, 2006.
Ronen Feldman et al., "The Text Mining Handbook: Advance Approaches in Analyzing Unstructured Data", Cambridge Univ. Pr., 2007.
Michael Hale Ligh et al., "Malware Analyst's Cookbook and DVD", Wiley, 2010.
M. Newman, "Networks: An Introduction", Oxford University Press, 2010.
Matt Bishop, "Computer Security: Art and Science", Addison-Wesley Professional, 2003.
Neils Provos et al., "Virtual Honeypots: Form Botnet Tracking to Intrusion Detection", Addison-Wesley Professional, Reading, 2007.
Michael Sipser, "Introduction to the Theory of Computation", International Thomson Publishing, 1996.
Peter Szor, "The Art of Computer Virus Research and Defense", Addison-Wesley Professional, 2005.
Anil K. Jain et al., "Algorithms for Clustering Data", Prentice-Hall, Inc., 1988.
V. Laurikari, "TRE", 2006 (5 pages).
P. Porras, "Inside Risks: Reflections on Conficker", Communications of the ACM, vol. 52, No. 10, pp. 23-24, Oct. 2009.
Changda Wang et al., "The Dilemma of Covert Channels Searching", ICISC 2005, LNCS 3935, pp. 169-174, 2006.
C. Willems et al., "Toward Automated Dynamic Malware Analysis Using CWSandbox", IEEE Security and Privacy, vol. 5, No. 2, pp. 32-39, 2007.
R Developmental Core Team, "R: A Language and Environment for statistical Computing", R. Foundation for Statistical Computing, Vienna Austria, 2008.
Simon Urbanek, "RJava: Low-Level-R to Java Interface", printed May 6, 2013 (5 pages).
Juan Caballero et al., "Polyglot: Automatic Extraction of Protocol Message Format Using Dynamic Binary Analysis", In Proceedings of ACM Conference on Computer and Communication Security, Oct. 2007 (15 pages).
Mihai Christodorescu et al., "Semantics-Aware Malware Detection", In Proceeding of the 2005 IEEE Symposium on Security and Privacy, pp. 32-46 (2005),.
Mihai Christodorescu et al,. "Mining Specifications on Malicious Behavior", ESEC/FSE'07, Sep. 3-7, 2007 (10 pages).
Peter Ferrie, "Attacks on Virtual Machine Emulators", Symantec Advance Threat Research, 2006 (13 pages).
Peter Ferrie, "Attacks on More Virtual Machine Emulators", Symantec Advance Threat Research, http://pferrie.tripod.com/papers/attacks2.pdf, 2007 (17 pages).
Tal Garfinkel et al., "A Virtual Machine Introspection Based Architecture for Intrusion Detection", In Proceedings of Network and Distributed Systems Security Symposium, Feb. 2003 (16 pages).
G. Hunt et al., "Detours: Binary Interception of WIN32 Functions", Proceedings of the 3rd Usenix Windows NT Symposium, Jul. 12-13, 1999 (9 pages).
Xuxian Jiang et al., "Stealthy Malware Detection Through VMM-Based "Out-of-the-Box" Semantic View Reconstruction", CCS'07, Oct. 29-Nov. 2, 2007 (11 pages).
Xuxian Jiang et al., "Virtual Playgrounds for Worm Behavior Investigation", RAID 2005, LNCS 3858, pp. 1-21 (2006).
Min Gyung Kang et al., "Renovo: A Hidden Code Extract for Packed Executables", WORM'07, Nov. 2, 2007 (8 pages).
Christopher Kruegel et al., "Detecting Kernel-Level Rootkits Through Binary Analysis", In Proceedings of the Annual Computer Security Applications Conference (ACSAC), pp. 91-100, Dec. 2004.
Lorenzo Martignoni et al., "OmniUnpack: Fast, Generic, and Safe Unpacking of Malware", In Proceedings of the Annual Computer Security Applications Conference (ACSAC), pp. 431-441 (2007).
Thomas Raffetseder et al., "Detecting System Emulators", In ISC, pp. 1-18 (2007).
Paul Royal et al., "PolyUnpack: Automating the Hidden-Code Extraction of Unpack-Executing Malware", In Proceedings of the Annual Computer Security Applications Conference (ACSAC), pp. 289-300 (2006).
Rich Uhlig et al., "Intel Virualization Technology", Computer, vol. 38, No. 5, pp. 48-56, May 2005.
Amit Vasudevan et al., "Stealth Breakpoints", In Proceedings of the 21st Annual Computer Security Applications Conference (ACSAC), pp. 381-392, (2005).
Amit Vasudevan et al., "Cobra: Fine-Grained Malware Analysis Using Stealth Localized-Executions", In Proceedings of the 2006 IEEE Symposium on Security and Privacy (S&P'06), pp. 264-279 (2006).
Yi-Min Wang et al., "Automated Web Patrol with Strider HoneyMonkeys: Finding Web Sites That Exploit Browser Vulnerabilities", In NDSS'06 (2006) (15 pages).
Heng Yin et al., "Panorama: Capturing System-Wide Information Flow for Malware Detection and Analysis", In Proceedings of ACM Conference on Computer and Communication Security, Oct. 29-Nov. 2, 2007 (13 pages).
Joanna Rutkowska, "Introducing Blue Pill", http://theinvisbilethings.blogspot.com/2006/06/introducing-blue-pill.html, Jun. 22, 2006 (26 pages).

(56) References Cited

OTHER PUBLICATIONS

Peter Ferrie, "Anti-Unpacker Tricks", In Proceedings of the 2nd International CARO Workshop (2008) (25 pages).
Danny Quist, "Covert Debugging Circumventing Software Armoring Techniques"; In Proceedings of Black Hat USA 2007 (2007) (5 pages).
Ulrich Bayer et al., "Scalable, Behavior-Based malware Clustering", In Network and Distributed System Security Symposium (2009) (18 pages).
David Brumley et al., "Automatically Identifying Trigger-Based Behavior in Malware", Botnet Detection, pp. 1-24 (2008).
Dancho Danchev, "Web Based Botnet Command and Control Kit 2.0", http://ddanchev.blogspot.com/2008/08/web-based-botnet-command-and-control.html, Aug. 22, 2008 (5 pages).
Ozgun Erdogan et al., "Hash-AV: Fast Virus Signature matching by Cache-Resident Filters", Int. J. Secur. Netw., vol. 2, pp. 50-59 (2007).
Fanglu Guo et al., "A Study of the Packer Problem and Its Solutions", In Recent Advances in Intrusion Detection (RAID 2008), LNCS 5230, pp. 95-115 (2008).
Maria Halkidi et al., "On Clustering Validation Techniques", Journal of Intelligent Information Systems, vol. 17, pp. 107-145 (2001).
A.K. Jain et al., "Data Clustering: A Review", ACM Computing Surveys, vol. 31, No. 3, pp. 264-323, Sep. 1999.
John P. John et al., "Studying Spamming Botnets using Botlab", In Usenix Symposium on Networked Systems Design and Implementation (NDSI), (2009) (16 pages).
Hyang-Ah Kim et al., "Autograph: Toward Automated, distributed Worm Signature Detection", In Usenix Security Symposium (2004) (16 pages).
Clemens Kolbitsch et al., "Effective and Efficient Malware Detection at the End Host", In 18th Usenix Security Symposium, pp. 351-366 (2009).
Kevin Borders et al., "Protecting Confidential Data on Personal Computers with Storage Capsules", In 18th Usenix Security Symposium, pp. 367-382 (2009).
Ralf Hund et al., "Return-Oriented Rootkits: Bypassing Kernel Code Integrity Protection Mechanisms", In 18th Usenix Security Symposium, pp. 383-398 (2009).
Christian Kreibich et al., "Honeycomb—Creating Intrusion Detection Signatures Using Honeypots", In ACM Workshop on Hot Topics in Networks (2003) (6 pages).
Zhichun Li et al., "Hamsa: Fast Signature Generational for Zero-Day Polymorphic Worms with Provable Attack Resilience", In IEEE Symposium on Security and Privacy (2006) (15 pages).
James Newsome et al., "Polygraph: Automatically Generating Signatures for Polymorphic Worms", In IEEE Symposium on Security and Privacy (2005) (16 pages).
Sun Wu et al., "AGREP—A Fast Approximate Pattern-Matching Tool", In Usenix Technical Conference (1992) (10 pages).
Vinod Yegneswaren et al.,, "An Architecture for Generating Semantics-Aware Signatures", In Usenix Security Symposium (2005) (16 pages).
Jaeyeon Jung, "Fast Portscan Detection Using Sequential Hypothesis Testing", In Proceedings of IEEE Symposium on Security Privacy, pp. 211-225 (2004).
Anestis Karasaridis et al., "Wide-Scale Botnet Detection and Characterization", In Usenix Workshop on Hot Topics in Understanding Botnets (HotBots'07), Apr. 11-13, 2007 (9 pages).
Carl Livades et al., "Using Machine Learning Techniques to Identify Botnet Traffic", In 2nd IEEE LCN Workshop on Network Security (WoNS'2006), pp. 967-974 (2006).
"CVE-2006-3439", http://cve.mitre.org/cgi-bin/cvename.cgi?name=CVE-2006-3439, printed Jun. 27, 2012 (2 pages).
David Moore, "Inferring Internet Denial-of-Service Activity", In Proceedings of the 10th Usenix Security Symposium, Aug. 13-17, 2001 (15 pages).
Peng Ning et al., "Constructing Attack Scenarios Through Correlation of Intrusion Alerts", In Proceedings of Computer and Communications Security (CCS'02), Nov. 18-22, 2002 (10 pages).

Vern Paxson, "Bro: A System for Detecting Network Intruders in Real-Time", In Proceedings of the 7th Usenix Security Symposium, Jan. 26-29, 1998 (22 pages).
Roberto Perdisci et al., "Using an Ensemble of One-Class SVM Classifiers to Harden Payload-Based Anomaly Detection Systems", In Proceedings of the 6th International Conference on Data Mining (ICDM'06), pp. 488-498, Dec. 2006.
Phillip A. Porras, "Privacy-Enabled Global Threat Monitoring", IEEE Security & Privacy, pp. 60-63 (2006).
Moheeb Abu Rajab et al., "A Multifaceted Approach to Understanding the Botnet Phenomenon", In Proceedings of the ACM SIGCOMM/Usenix Internet Measurement Conference (ICM'06), Oct. 25-27, 2006 (12 pages).
Anirudh Ramachandran et al., "Understanding the Network-Level Behavior of Spammers", In Proceedings of the 2006 Conference on Applications, Technologies, Architectures, and Protocols for Computer Communications (SIGCOMM'06), Sep. 11-16, 2006 (13 pages).
Martin Roesch, "SNORT—Lightweight Intrusion Detection for Networks", In Proceedings of 13th System Administration Conference (LISA'99), pp. 229-238, Nov. 7-12, 1999.
Robin Sommer et al., "Enhancing Byte-Level Network Intrusion Detection Signatures with Context", In Proceedings of the 10th ACM Conference on Computer and Communications Security (CCS'03), pp. 262-271, Oct. 27-30, 2003.
"W32/IRCBot-TO", http://www.sophos.com/virusinfo/analyses.w32ircbotto.html, Jan. 19, 2007 (1 page).
Stuart Staniford et al., "Practical Automated Detection of Stealthy Portscans", Journal of Computer Security, vol. 10, pp. 105-136 (2002).
S. Staniford-Chen et al., "GrIDS-A Graph Based Intrusion Detection System for Large Networks", In Proceedings of the 19th National Information Systems Security Conference, pp. 361-370 (1996).
Steven J. Templeton et al., "A Requires/Provides Model for Computer Attacks", In Proceedings of the 2000 Workshop on New Security Paradigms (NSPW'00), pp. 31-38 (2000).
Alfonso Valdes et al., "Probabilistic Alert Correlation", In Proceedings of the Recent Attack in Intrusion Detection (RAID 2001), LNCS 2212, pp. 54-68 (2001).
Fredrik Valeur et al., "A Comprehensive Approach to Intrusion Detection Alert Correlation", IEEE Transactions on Dependable and Secure Computing, vol. 1, No. 3, pp. 146-169, Jul. 2004.
Kjersti Aas et al., "Text Categorisation: A Survey", Norwegian Computing Center, Jun. 1999 (38 pages).
M. Andrews, "Negative Caching of DNS Queries (DNS NCACHE)", http://tools.ietf.org/html/rfc2308, Mar. 1998 (20 pages).
Simon Biles, "Detecting the Unknown with Snort and Statistical Packet Anomaly Detecting Engine", www.cs.luc.edu/~pld/courses/447/sum08/class6/biles.spade.pdf (2003) (9 pages).
James Newsome et al., "Paragraph: Thwarting Signature Learning by Training Maliciously", In Recent Advance in Intrusion Detection (RAID), 2005 (21 pages).
Jon Oberheide et al., "CloudAV: N-Version Antivirus in the Network Cloud", In Proceedings of the 17th Usenix Security Symposium, pp. 91-106 (2008).
Dan Pelleg et al., "X-Means: Extending K-Means with Efficient Estimation of the Number of Clusters", In International Conference on Machine Learning (2000) (8 pages).
Roberto Perdisci et al., "Misleading Worm Signature Generators Using Deliberate Noise Injection", In IEEE Symposium on Security and Privacy (2006) (15 pages).
Mark Felegyhazi et al., "On the Potential of Proactive Domain Blacklisting", In the Third Usenix LEET Workshop (2010) (8 pages).
Konrad Rieck et al., "Learning and Classification of Malware Behavior", DIMVA 2008, LNCS 5137, pp. 108-125 (2008).
Sumeet Singh et al., "Automated Worm Fingerprinting", In ACM/USENIX Symposium on Operating System Design and Implementation, Dec. 2004 (16 pages).
"EFnet Chat Network", http://www.efnet.org, dated Jun. 18, 2007 (3 pages).

(56) References Cited

OTHER PUBLICATIONS

Guofei Gu et al. "Bothunter: Detecting Malware Infection Through IDS-Driven Dialog Correlation", Proceedings of 16th USENIX Security Symposium, pp. 167-182 (2007).
The Conficker Working Group, "Conficker Working Group: Lessons Learned", Conficker_Working_Group_Lessons_Learned_17_June_2010_final.pdf, published Jan. 2011 (59 pages).
Manos Antonakakis et al., "The Command Structure of the Aurora Bonet", http://www.damballa.com/downloads/r_pubs/Aurora_Botnet_Command_Structure.pdf, 2010 (31 pages).
R. Arends et al., "Protocol Modifications for the DNS Security Extensions", htp://www.ietf.org/rfc/rfc4035.txt, Mar. 2005 (50 pages).
R. Arends et al., "DNS Security Introduction and Requirements", htp://www.ietf.org/rfc/rfc4033.txt, Mar. 2005 (20 pages).
R. Arends et al., "Resource Records for the DNS Security Extensions", htp://www.ietf.org/rfc/rfc4034.txt, Mar. 2005 (28 pages).
Andreas Berger et al., "Assessing the Real-World Dynamics of DNS", Lecture Notes in Computer Science, vol. 7189, pp. 1-14 (2012).
Global Research & Analysis Team (GReAT), "Full Analysis of Flame's Command & Control Servers", http://www.securelist.com/en/blog/750/Full_Analysis_of_Flames_Command_Control_Servers, Sep. 17, 2012 (10 pages).
Nicolas Falliere et al., "W32.Stuxnet Dossier", http://www.symantec.com/content/en/us/enterprise/media/security_response/whitepapers/w32_stuxnet_dossier.pdf, Feb. 2011 (69 pages).
Steinar H. Gunderson, "Global IPv6 Statistics: Measuring the Current State of IPv6 for Ordinary Users", http://meetings.ripe.net/ripe-57/presentations/Colitti-Global_IPv6_statistics_-_Measuring_the_current_state_of_IPv6_for_ordinary_users_.7gzD.pdf, Oct. 24-30, 2008 (20 pages).
Jaeyeon Jung et al., "Modeling TTL-Based Internet Caches", IEEE INFOCOM 2003, pp. 417-426, Mar. 2003.
Srinivas Krishnan et al., "DNS Prefetching and Its Privacy Implications: When Good Things Go Bad", In Proceeding of the 3rd USENIX Conference on Large-Scale Exploits and Emergent Threats: Botnets, Spyware, Worms, and More (LEET'10), (2010) (9 pages).
Zhuoqing Morley Mao et al., "A Precise and Efficient Evaluation of the Proximity Between Web Clients and Their Local DNS Servers", In Proceedings of USENIX Annual Technical Conference (2002) (14 pages).
Mozilla Foundation, "Public Suffix List", http://publicsuffix.org/, printed May 23, 2013 (8 pages).
David Plonka et al., "Context-Aware Clustering of DNS Query Traffic", In Proceedings of the 8th IMC (2008) (13 pages).
RSA FraudAction Research Labs, "Anatomy of an Attack", http://blogs.rsa.com/rivner/anatomy-of-an-attack/, Apr. 1, 2011 (17 pages).
Steve Souders, "Sharing Dominant Domains", http://www.stevesouders.com/blog/2009/05/12/sharding-dominant-domains, May 12, 2009 (3 pages).
Paul Vixie, "What DNS is Not", Communications of the ACM, vol. 52, No. 12, pp. 43-47, Dec. 2009.
N. Weaver et al., "Redirecting DNS for ADS and Profit", In USENIX Workshop on Free and Open communications on the Internet (FOCI), Aug. 2011 (6 pages).
Florian Weimer, "Passive DNS Replication", In Proceedings of the 17th Annual FIRST Conference on Computer Security Incident, Apr. 2005 (13 pages).
Manos Antonakakis et al., "Unveiling the Network Criminal Infrastructure of TDSS/TDL4", http://www.damballa.com/downloads/r_pubs/Damballa_tdss_tdl4_case_study_public.pdf, (undated) (16 pages).
Manos Antonakakis et al., "From Throw-Away Traffic to Bots: Detecting the Rise of DGA-Based Malware", In Proceedings of the 21st USENIX Conference on Security Symposium (Security'12), (2012) (16 pages).
T. Berners-Lee et al., "RFC3986—Uniform Resource Identifier (URI): Generic Syntax", http://www.hjp.at/doc/rfc/rfc3986.html, Jan. 2005 (62 pages).
Juan Caballero et al., "Measuring Pay-Per-Install: The Commoditization of malware Distribution", In Proceedings of the 20th USENIX Conference on Security (SEC'11), (2011) (16 pages).
Chih-Chung Chang et al., "LIBSVM: A Library for Support Vector Machines" ACM Transactions on Intelligent Systems and Technology 2011, Last Updated Jun. 14, 2007 (26 pages).
Dancho Danchev, "Leaked DIY Malware Generating Tool Spotted in the Wild", http://blog.webroot.com/2013/01/18/leaked-diy-malware-generating-tool-spotted-in-the-wild/, Jan. 18, 2013 (6 pages).
D. De La Higuera et al., "Topology of Strings: Median String is NP-Complete", Theoretical Computer Science, vol. 230, pp. 39-48 (2000).
Robert Edmonds, "ISC Passive DNS Architecture", http://kb.isc.org/getAttach/30/AA-00654/passive-dns-architecture.pdf, Mar. 2012 (18 pages).
Manuel Egele et al., "A Survey on Automated Dynamic Malware-Analysis Techniques and Tools", ACM Computing Surveys, vol. 44, No. 2, Article 6, pp. 6:1-6:42, Feb. 2012.
Dennis Fisher, "Zeus Source Code Leaked", http://threatpost.com/en_us/blogs/zeus-source-code-leaked-051011, May 10, 2011 (6 pages).
Guofei Gu et al., "BotSniffer: Detecting Botnet Command and Control Channels in Network Traffic", In Proceedings of the 15th Annual Network and Distributed System Security Symposium (NDSS'08), Feb. 2008 (18 pages).
Grefoire Jacob, "Jackstraws: Picking Command and Control Connections from Bot Traffic", In Proceedings of the 20th USENIX Conference on Security (SEC'11) (2011) (16 pages).
Jiyong Jang et al., "Bitshred: Feature Hashing Malware for Scalable Triage and Semantic Analysis", In Proceedings of the 18th ACM Conference on Computer and Communications Security (CCS'11), pp. 309-320, Oct. 17-21, 2011.
J. Zico Kolter et al., "Learning to Detect and Classify Malicious Executables in the Wild", Journal of Machine Learning Research, vol. 7, pp. 2721-2744, Dec. 2006.
John C. Platt, "Probablistic Outputs for Support Vector Machines and Comparisons to Regularized Likelihood Methods", Advances in Large margin Classifiers, vol. 10, No. 3, pp. 61-74, Mar. 26, 1999.
Team Cymru, "Developing Botnets", http://www.team-cymru.com/ReadingRoom/VVhitepapers/2010/developing-botnets.pdf (2010) (3 pages).
Brett Stone-Gross et al., "Pushdo Downloader Variant Generating Fake HTTP Requests", http://www.secureworks.com/cyber-threat-intelligence/threats/Pushdo_Downloader_Variant_Generating_Fake_HTTP_Requests/, Aug. 31, 2012 (4 pages).
Peter Wurzinger et al., "Automatically Generating Models for Botnet Detection", In Proceedings of the 14th European Conference on Research in Computer Security (ESORICS'09), pp. 232-249 (2009).
Yinglian Xie et al., "Spamming Botnet: Signatures and Characteristics", In Proceeding of the ACM SIGCOMM 2008 Conference on Data Communications (SIGCOMM'08), pp. 171-182, Aug. 17-22, 2008.
Yajin Zhou et al., "Dissecting Android Malware: Characterization and Evolution", 2012 IEEE Symposium on Security and Privacy, pp. 95-109 (2012).
Nello Cristianini et al., "An Introduction to Support Vector Machines: and other Kernal-Based Learning Methods", Cambridge University Press, New York, NY, USA (2000).
Timo Sirainen, "IRSSI", http://en.wikipedia.org/wiki/Irssi, updated May 8, 2013 (3 pages).
Team Cymru, "IP to ASN Mapping", http://www.team-cymru.org/Services/ip-to-asn.html, printed Mar. 23, 2013 (6 pages).
http://www.bleedingsnort.com, retrieved from Internet Archive on May 23, 2013, Archived Sep. 26, 2006 (3 pages).
http://www.dshield.org, retrieved from Internet Archive on May 23, 2013, Archived Sep. 29, 2006 (2 pages).
http://www.alexa.com, retrieved from Internet Archive on May 23, 2013, Archived Sep. 25, 2006 (3 pages).

(56) References Cited

OTHER PUBLICATIONS https://sie.isc.org/, retrieved from Internet Archive on May 23, 2013, Archived Dec. 29, 2008 (2 pages).
http://damballa.com, retrieved from Internet Archive on May 23, 2013, Archived Jan. 28, 2007 (10 pages).
http://www.dnswl.org, retrieved from Internet Archive on May 23, 2013, Archived Jul. 15, 2006 (4 pages).
http://www.spamhaus.org/sbl/, retrieved from Internet Archive on May 23, 2013, Archived Sep. 24, 2006 (24 pages).
http://malwaredomains.com, retrieved from Internet Archive on May 23, 2013, Archived Dec. 28, 2007 (12 pages).
http://www.opendns.com, retrieved from Internet Archive on May 23, 2013, Archived Sep. 9, 2006 (25 pages).
https://zeustracker.abuse.ch, retrieved from Internet Archive on May 23, 2013, Archived Oct. 26, 2010 (37 pages).
http://www.threatfire.com, retrieved from Internet Archive on May 23, 2013, Archived Aug. 22, 2007 (18 pages).
http://www.avira.com, retrieved from Internet Archive on May 23, 2013, Archived Sep. 29, 2006 (13 pages).
https://alliance.mwcollect.org, retrieved from Internet Archive on May 23, 2013, Archived Jan. 7, 2007 (2 pages).
http://malfease.oarci.net, retrieved from Internet Archive on Apr. 11, 2014, Archived Apr. 12, 2008 (2 pages).
http://www.oreans.com/themida.php, retrieved from Internet Archive on May 23, 2013, Archived Aug. 23, 2006 (12 pages).
http://www.vmware.com, retrieved from Internet Archive on May 23, 2013, Archived Sep. 26, 2006 (32 pages).
Thomas Ptacek, "Side-Channel Detection Attacks Against Unauthorized Hypervisors", http://www.matasano.com/log/930/side-channel-detection-attacks-against-unauthorized-hypervisors/, Aug. 20, 2007, retrieved from Internet Archive on May 23, 2013, Archived Aug. 27, 2007 (12 pages).
http://cyber-ta.org/releases/botHunter/index.html, retrieved from Internet Archive on May 23, 2013, Archived Aug. 30, 2007 (6 pages).
http://anubis.seclab.tuwien.ac.at, retrieved from Internet Archive on May 23, 2013, Archived Apr. 9, 2008 (2 pages).
http://www.siliconrealms.com, retrieved from Internet Archive on May 23, 2013, Archived Sep. 4, 2006 (12 pages).
http://bitblaze.cs.berkeley.edu, retrieved from Internet Archive on May 23, 2013, Archived Jan. 28, 2008 (4 pages).
http://www.dyninst.org, retrieved from Internet Archive on May 23, 2013, Archived Aug. 20, 2006 ( pages).
http://www.peid.info, retrieved from Internet Archive on May 23, 2013, Archived Dec. 4, 2007 (2 pages).
Mark Russinovich et al., "RegMon for Windows V7.04", http://technet.microsoft.com/en-us/sysinternals/bb896652.aspx, Published Nov. 1, 2006 (4 pages).
"Troj/Agobot-IB", http://www.sophos.com/virusinfo/analyses/trojagobotib.html, printed Jun. 27, 2012 (1 page).
Mark Russinovich et al., "FileMon for Windows V7.04", http://technet.microsoft.com/en-us/sysinternals/bb896642.aspx, Nov. 1, 2006 (6 pages).
"Norman Sandbox Whitepaper", Copyright Norman 2003 (19 pages).
Tanveer Alam et al., "Webinar: Intel Virtualization Technology of Embedded Applications", Intel, Copyright 2010 (34 pages).
F. Heinz et al., "IP Tunneling Through Nameserver", http://slashdot.org/story/00/09/10/2230242/ip-tunneling-through-nameservers, Sep. 10, 2000 (23 Pages).
http://www.mcafee.com/us/, printed May 23, 2013 (23 pages).
"Windows Virtual PC", http://en.wikipedia.org/wiki/Windows_Virtual_PC, Last Modified May 5, 2013, Printed May 23, 2013 (21 pages).
Par Fabien Perigaud, "New Pill?", http://cert.lexsi.com/weblog/index.php/2008/03/21/223-new-pill, Mar. 21, 2008 (3 pages).
http://handlers.sans.org/jclausing/userdb.txt, printed May 24, 2013 (149 pages).
Avi Kivity et al., "KVM: The Linux Virtual Machine Monitor", Proceedings of the Linux Symposium, pp. 225-230, Jun. 27-30, 2007.
Symantec, "Symantec Global Internet Security Threat Report: Trends for 2008", vol. XIV, Apr. 2009 (110 pages).
Leo Breiman, "Bagging Predictors", Machine Learning, vol. 24, pp. 123-140 (1996).
David S. Anderson et al., "Spamscatter: Characterizing Internet Scam Hosting Infrastructure", Proceedings of the USENIX Security Symposium (2007) (14 pages).
Sujata Garera et al., "A Framework for Detection and Measurement of Phishing Attacks", WORM'07, pp. 1-8, Nov. 2, 2007.
Torsten Horthorn et al., "Double-Bagging: Combining Classifiers by Bootstrap Aggregation", Pattern Recognition, vol. 36, pp. 1303-1309 (2003).
Roberto Perdisci et al., "Detecting Malicious Flux Service Networks Through Passive Analysis of Recursive DNS Traces", Proceedings of ACSAC, Honolulu, Hawaii, USA (2009) (10 pages).
Shuang Hao et al., "Detecting Spammers with SNARE: Spatiotemporal Network-Level Automatic Reputation Engine", 18th USENIX Security Symposium, pp. 101-117 (2009).
Kazumichi Sato et al., "Extending Black Domain Name List by Using Co-Occurrence Relation Between DNS Queries", Presentation in the Third USENIX LEET Workshop (2010) (22 pages).
Sushant Sinha et al., "Shades of Grey: On the Effectiveness of Reputation-Based Blacklists", In 3rd International Conference on MALWARE (2008) (8 pages).
Zhiyun Qian et al., "On Network-Level Clusters for Spam Detection", In Proceedings of the USENIX NDSS Symposium (2010) (17 pages).
Bojan Zdrnja et al., "Passive Monitoring of DNS Anomalies", In Proceedings of DIMVA Conference (2007) (11 pages).
Jian Zhang et al., "Highly Predictive Blacklisting", In Proceedings of the USENIX Security Symposium (2008) (16 pages).
http://www.uribl.com/about.shtml, retrieved from Internet Archive on Mar. 16, 2016, Archived Jul. 22, 2010 (4 pages).
http://www.spamhaus.org/zen/, retrieved from Internet Archive on Mar. 16, 2016, Archived Jul. 6, 2010 (3 pages).
Mathew Sullivan, "Fighting Spam by Finding and Listing Exploitable Servers", Apricot 2006 (26 pages).
Nan Jiang et al., "Identifying Suspicious Activities Through DNS Failure Graph Analysis", In proceedings of the 18th IEEE International Conference on Network Protocols (ICNP'10) IEEE Computer Society, Washington, DC, USA, 144-153 (2010).
File History of U.S. Appl. No. 11/538,212.
File History of U.S. Appl. No. 12/538,612.
File History of U.S. Appl. No. 12/985,140.
File History of U.S. Appl. No. 13/008,257.
File History of U.S. Appl. No. 13/205,928.
File History of U.S. Appl. No. 13/309,202.
File History of U.S. Appl. No. 13/358,303.
File History of U.S. Appl. No. 13/749,205.
File History of U.S. Appl. No. 14/010,016.
File History of U.S. Appl. No. 14/015,582.
File History of U.S. Appl. No. 14/015,621.
File History of U.S. Appl. No. 14/015,663.
File History of U.S. Appl. No. 14/015,704.
File History of U.S. Appl. No. 14/015,661.
File History of U.S. Appl. No. 14/041,796.
File History of U.S. Appl. No. 14/096,803.
File History of U.S. Appl. No. 14/194,076.
File History of U.S. Appl. No. 14/304,015.
File History of U.S. Appl. No. 14/305,998.
File History of U.S. Appl. No. 14/317,785.
File History of U.S. Appl. No. 14/616,387.
File History of U.S. Appl. No. 15/019,272.
Kristoff, Botnets, Detection and Mitigation: DNS-Based Techniques, NU Security Day (2005) 23 pages, www.it.northwesterd.edu/bin/docs/bots_Kristoff_jul05.ppt.
Park et al. "Fast Malware Classification by Automated Behavioral Graph Matching" (2010) Proceedings of the Sixth Annual Workshop on Cyber Security and Information Intelligence Research (CSIIRW '10), ACM pp. 1-4.

* cited by examiner

MEASURING, CATEGORIZING, AND/OR MITIGATING MALWARE DISTRIBUTION PATHS

BRIEF DESCRIPTIONS OF THE DRAWINGS

DETAILED DESCRIPTION OF SEVERAL EMBODIMENTS

Figure 1:
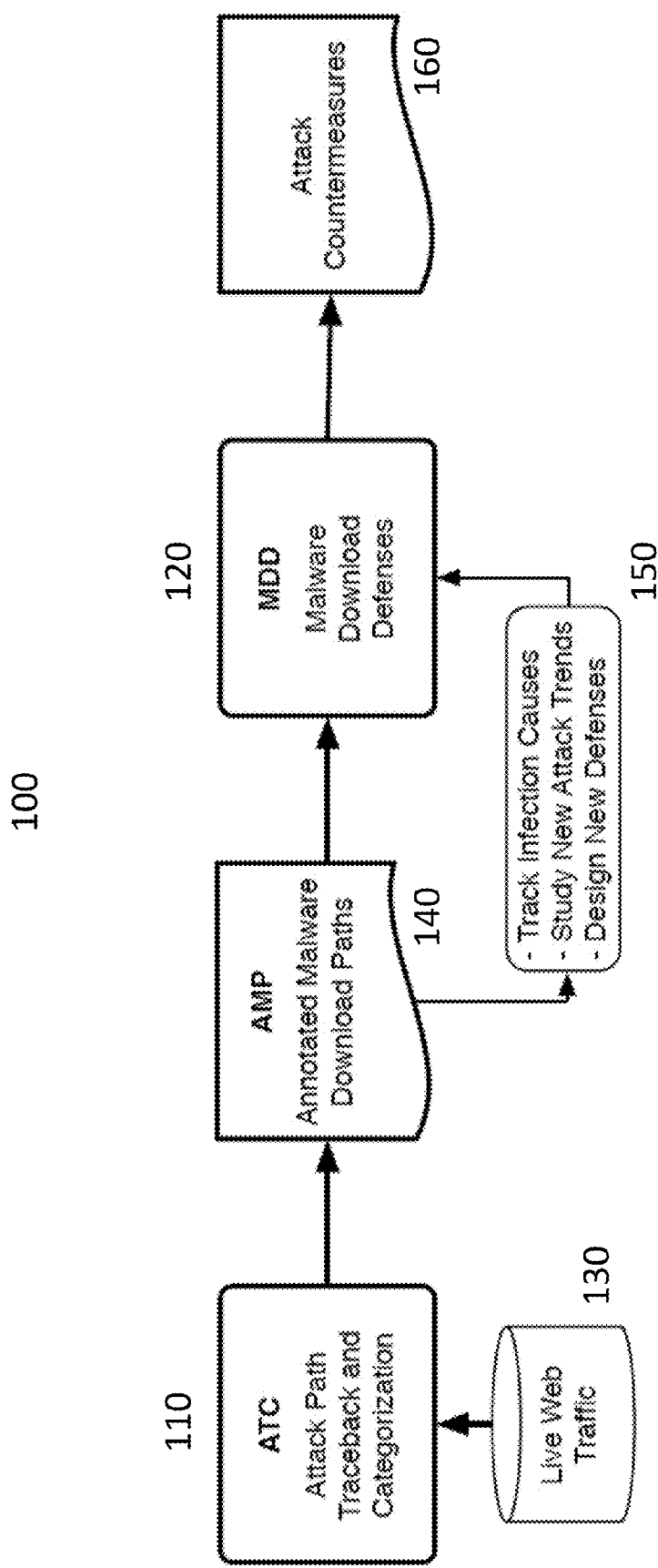
FIG. 1 is a malware path detection and countermeasure system according to an embodiment of the invention.

Many modern malware download attacks occur via a web browser, for example due to social engineering and/or drive-by downloads. The systems and methods described herein may provide incident investigation that may be based on the web paths followed by users who fall victim to malware download attacks. Automatic trace back and labeling of a sequence of events (e.g., visited web pages) preceding malware downloads may highlight how users reach attack pages on the web. These automatically labeled in-the-wild malware download paths may be leveraged to better current attack trends and to develop more effective defenses. In some embodiments this procedure may significantly decrease the infection rate of drive-by downloads based on malicious content injection (e.g., by almost 6 times compared to some URL blacklisting approaches). In some sensitive networks (e.g., enterprise and government networks) including SSL Man-In-The-Middle (MITM) proxies, the systems and methods described herein may work alongside such SSL MITM proxies. Furthermore, the automatic trace back and labeling systems and methods described herein may provide a generic trace back approach that may be applied to find the sequence of events leading to any activity, including non-malicious activity. The generic trace back approach may not rely on the properties of redirection chains, but may reconstruct a full web path from an origin page to an event, providing context around the event.

Systems and methods described herein may comprise one or more computers, which may also be referred to as processors. A computer may be any programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. Those of ordinary skill in the art will appreciate that those terms used herein are interchangeable, and any computer capable of performing the described functions may be used. For example, though the term "smartphone" may appear in the specification, the disclosed embodiments are not limited to smartphones.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connection). Connections between computers may use any protocols, including connection-oriented protocols such as TCP or connectionless protocols such as UDP. Any connection through which at least two computers may exchange data can be the basis of a network.

FIG. 1 is a malware path detection and countermeasure system 100 according to an embodiment of the invention. They system 100 may include an attack path traceback and categorization (ATC) module 110 and a malware download defense (MDD) module 120. Given all (live) network traffic 130 generated by a user's browsing activities within a time window that may include a malware download event, the ATC module 110 may identify and link together all HTTP requests and responses that constitute the web path followed by the user from a "root" node (e.g., a search engine) to the actual malware download page, filtering out all other irrelevant traffic. A statistical classifier of the ATC module 110 may automatically divide all collected malware download paths into update, social engineering, and drive-by attacks. The output of the ATC module may be annotated malware download paths (AMP) 140.

The AMPs 140 may be continuously updated as new malware downloads are witnessed in the live traffic 130 and may therefore be used to aid the study of recent attack trends. Furthermore, the AMP datasets may enable designing and building new defenses 150 that can be plugged into the MDD module 120. The MDD module 120 may supply attack countermeasures 160 which may be used to safeguard against similar malware downloads. As an example, by studying thousands of real-world web paths leading to drive-by malware downloads, it may be possible to automatically trace back the domain names typically used in drive-by attacks to inject malicious code into compromised web pages (e.g., via the source of a malicious script or iframe tag). The injected code may be used as an attack trigger, directing the browser towards an actual exploit and finally to a "transparent" malware download and execution. Automatically discovering and promptly blocking (or blacklisting) the domain names serving the injected malicious code may be an effective defense. In some cases, this defense method may be more effective than blacklisting the URLs that directly serve the drive-by browser exploits themselves or the actual malware executables. Note that while the examples described herein relate to tracing traffic from a malicious download, the systems and methods described herein may be used to identify and label paths for any event (e.g., benign download, web page view, etc.).

Terminology and Examples

The following terminology will be used throughout the description of the malware path detection and countermeasure systems and methods. Two examples that further illustrate these concepts are also provided.

Figure 2:
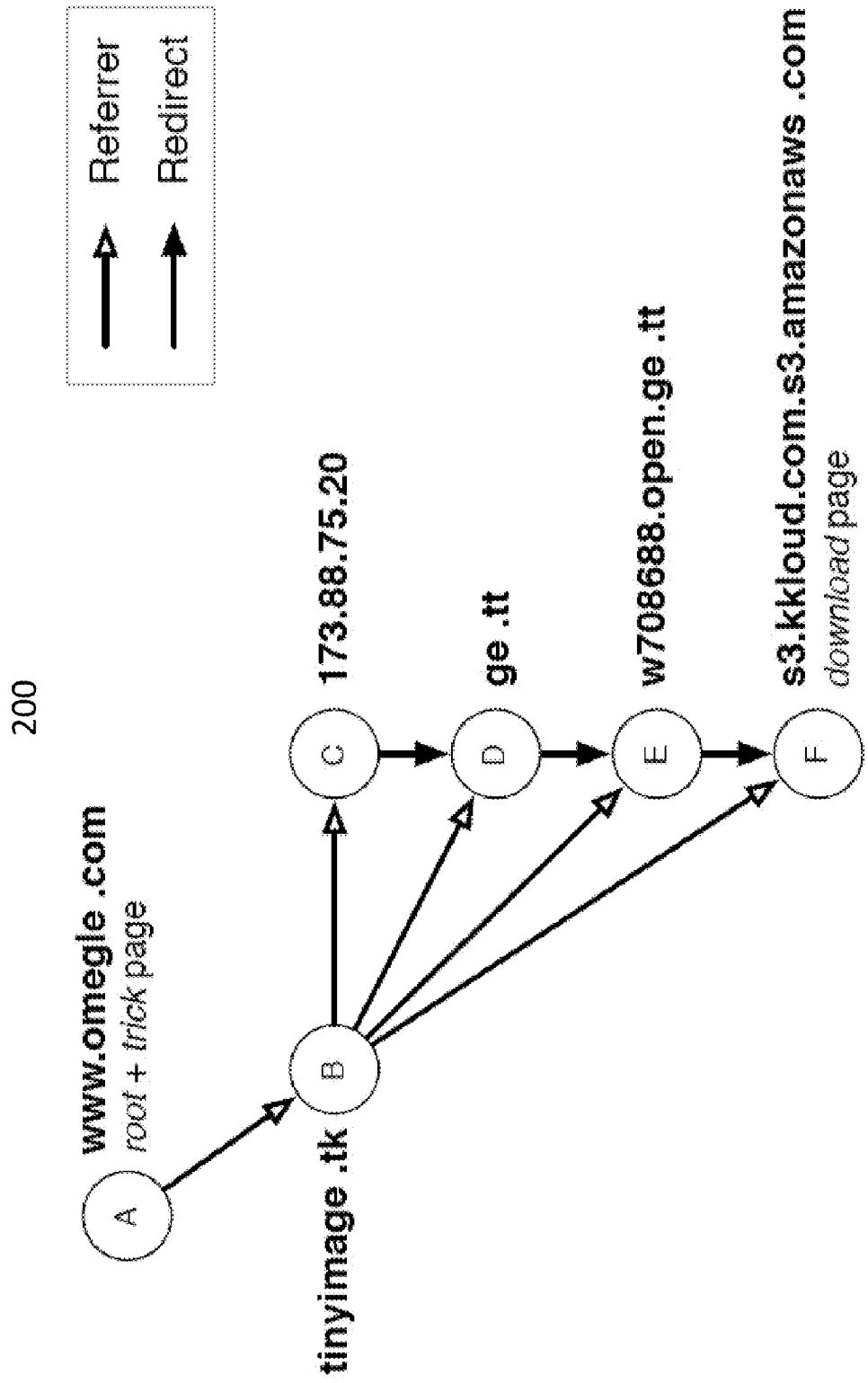
FIG. 2 is an example social engineering malware download process.
Figure 3:
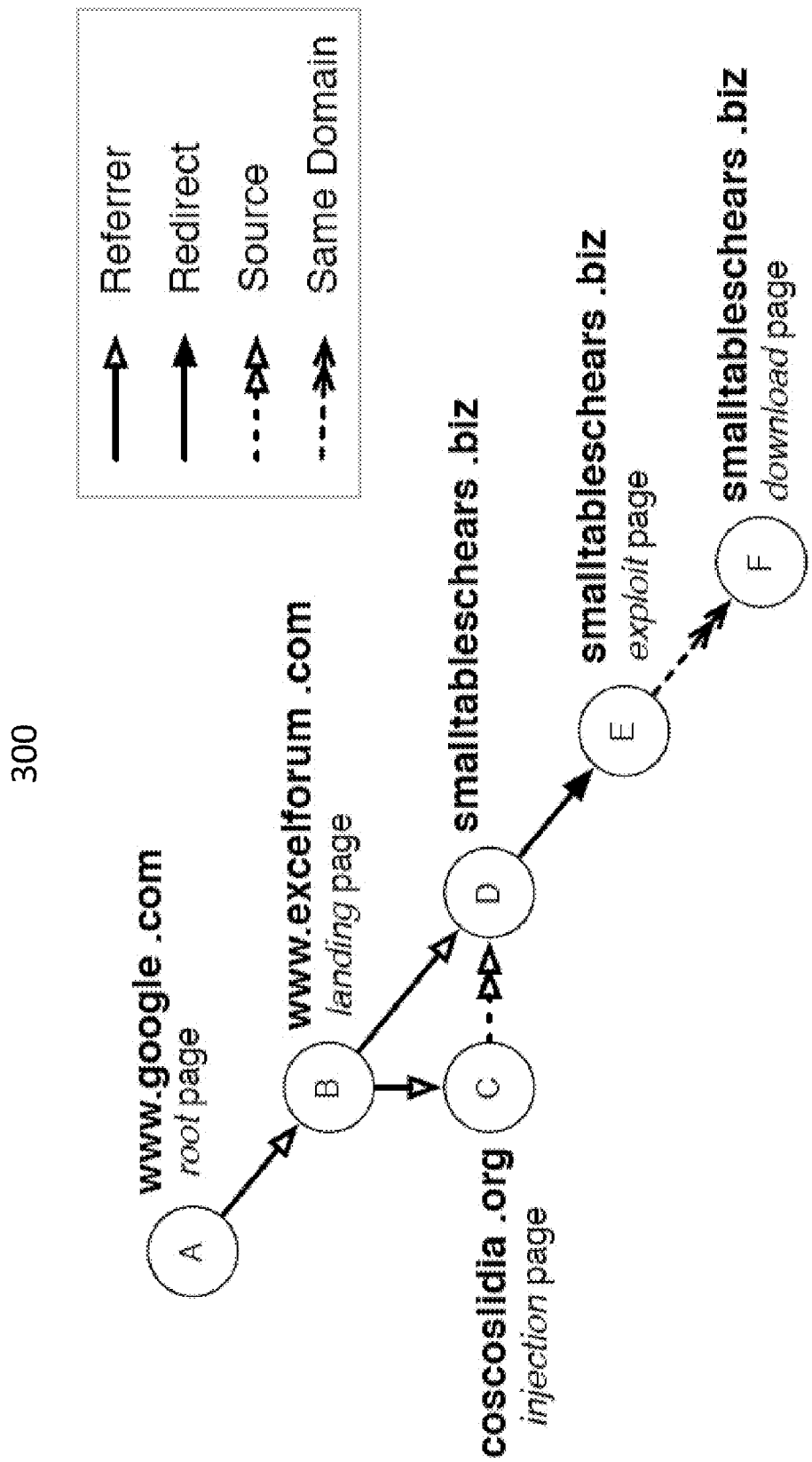
FIG. 3 is an example drive-by malware download process.

Download Path and Cause: A malware download web path (or "download path", for short) is the sequence of HTTP transactions (i.e., request-response pairs) that led to an in-the-wild malware download. These transactions may be due to explicit user-browser interactions (e.g., via a hyperlink click) or automatically generated by the browser (e.g., via a server-imposed redirection, JavaScript, etc.). The first transaction on the download path may be referred to the root of the path. In practice, the root of a malicious download path may often be, but is not always, a search engine. The last HTTP transaction in the download path is the download event itself. The transactions in between constitute the rest of the web path taken by the user (or more precisely, her browser), starting from the root to an attack page and then to the actual malware download. FIGS. 2 and 3 show two examples of such malware download paths.

Some malicious executable downloads are due to one of the following three broad causes: social engineering attacks, drive-by exploits, or a malware update or "drop". A download path may be considered to be the result of social engineering if explicit user interaction (e.g., a mouse click) is required to initiate the download and "voluntarily" run an executable file. In contrast, a download path may be considered to be the result of a drive-by exploit if it does not require this level of user interaction, because the malicious executable may be transparently (i.e., unnoticed by the user) downloaded and run, for example due to a browser exploit. Notice that while the attacker may (in some cases) use some form of social engineering to lure the victim towards a drive-by exploit page, in this case the download event itself is "involuntary" and transparent to the user, and therefore the entire download path as may still be labeled drive-by. Finally, when the downloading process is external (or via a malicious extension) to the browser and requires no explicit interaction with the user, it may be referred to as a malware update, though this cause category also includes the malware "dropping" a different malware file (e.g., in the case of a pay-per-install scheme).

Drive-by download paths may unfold in different steps, which may be dictated by the attackers' need to avoid trivial blacklisting and to implement successful exploit-as-a-service frameworks. For example, besides the root and download pages, the path may include a landing page, an injection page, and an exploit page. The landing page may be a benign "hacked" page, where malicious content has been injected by an attacker. A common approach may be to add an iframe or script tag to this page, which forces the browser to load and render (or inject) malicious content (e.g., some JavaScript code) from another domain. The malicious code may further redirect the browser to the actual exploit page. Lastly, the exploit page may attempt to deliver one or more exploits to the browser (e.g., a malicious .JAR file) to trigger a vulnerability and force the browser to download and run a malicious file.

FIG. 2 is an example social engineering malware download process 200. This process 200 may be a download path (i.e., the sequence of HTTP transactions) for an in-the-wild social engineering attack, including the "link" relationships between nodes in the path. In this example, the user first joins a (web) chat room on www.omegle.com (A), which represents the root of the path. Within the chat room, a (malicious) user posts the following question: "everyone at school says im ugly behind my back and my whole family wants me to change how i look . . . give me your honest opinions?? tinyimage[dot]tk?/image/IMG_0210.jpg". Node (A) may also represent the "trick" page that encourages the victim to click on a malicious link. In this case, the victim clicks on the URL believing it to be a link to an image (B). However, notice that what appears to be the path to a .jpg file is within the context of the URL query string (following the '?'). The link takes the user to an HTML page containing a frame loaded from IP address 173.88.75.20. (C) 173.88.75.20 responds with a redirect to a URL on ge.tt, a free file-sharing site (D). The ge.tt URL results in a temporary redirect to a different ge.tt URL and then another redirect (E) to s3.kkloud.com.s3.amazonaws.com (F). Finally, a malicious binary (later detected as "Trojan Generic" by some anti-virus scanners (AVs)) is downloaded from that same amazonaws.com subdomain, which represents the download event page. Notice that no exploit appears to be involved in this attack, and that the user had to explicitly click on the downloaded malware to execute it.

FIG. 3 is an example drive-by malware download process 300. This process 300 may be a download path related to an in-the-wild drive-by download. The download path originates from (A) www.google.com (the root page), where the user entered the search terms "add years and months together." The first link in the search results, which the user clicked on, is for a webpage (B) on www.excelforum[dot]com (the landing page). Sadly, the page the user landed on was compromised several days earlier, resulting in the addition of a <script> tag with source at coscoslidia[dot]org, which is the injection page. The script is automatically retrieved from (C) and executed, forcing an <iframe> to be added and rendered. The source of the frame (D) is on the site smalltableschears[dot]biz, from which the content is immediately fetched and included in the page. The newly loaded JavaScript served by (D) then checks for the presence of vulnerable versions of several browser plugins. It quickly matches a version of the installed Adobe Flash Player to a known vulnerability and dynamically adds another <iframe> to the page, which pulls a malicious Flash exploit file from (E) on the same smalltableschears[dot]biz site (the exploit page). The Flash exploit succeeds, and the shellcode fetches a malware binary (labeled as ZeroAccess by some AVs) from (F) on the same domain smalltableschears[dot]biz (the download page).

Example Data Collection

The following example data relates to the results of a large study of in-the-wild malware downloads captured on a live academic network. Such studies may result in collection of a labeled dataset of download paths that can be used to design, train, and evaluate the ATC 110 and MDD 120 modules. A detailed discussion of the ATC 110 and MDD 120 modules is provided below.

In this example, the network traffic of a large academic network serving tens of thousands of users was monitored for a period of six months. Deep packet inspection was used to perform on-the-fly TCP flow reconstruction, keeping a buffer of all recent HTTP transactions (i.e., request-response pairs) observed on the network. For each transaction, the content of the response was checked to determine if it contained an executable file. If so, all buffered HTTP transactions related to the client that initiated the download were retrieved. Specifically, all HTTP traffic a client generated preceding (and including) an executable file download was stored, allowing observation of what web path users followed before falling victim to malware downloads. Over the duration of the study, tens of thousands of executable file downloads were observed, including thousands of malicious ones. Those of ordinary skill in the art will appreciate that the specific traffic monitoring techniques used in this example may be applied to other networks and also that other traffic monitoring techniques may be used to gather data about malicious downloads.

Many legitimate applications may be installed or updated via HTTP (e.g., Windows Update), resulting in benign executables composing a majority of observed downloads. Therefore, downloads from a manually compiled whitelist of domain names (e.g., including approximately 120 effective second level domains (e2LDs) of popular benign sites (e.g., microsoft.com, google.com, etc.)) may be automatically excluded. The remaining downloads may be scanned with AV (e.g., in this example the downloads were scanned with more than 40 AV engines using virustotal.com). In addition, the downloads may be periodically rescanned, because many "fresh" malware files are not immediately detected by AV scanners, allowing identification of some "zero-day" downloads. A file may be labeled as malicious if at least one of the top five AV vendors (w.r.t. market share) and a minimum of two other AVs detect it as malicious, for example, although other criteria may be possible. The remaining downloads may be considered benign until the rescan. In addition, binary samples that are assigned labels that are too generic or based purely on AV detection heuristics may be discarded. Overall, during the six month study referenced herein, 5,536 malicious downloads were discovered.

Many of the malicious downloads are related to adware. As the desired data may be related to malware downloads, a number of "best effort" heuristics may be applied to separate adware from malware. For example, given a malicious file, if the majority of AV labels contain the term "adware" or related empirically derived keywords that identify specific unwanted applications (e.g., "not-a-virus", "installer", "PUP", etc.), the file may be labeled as adware. The remaining malicious binaries may be labeled as malware. Because AV labels may be imprecise (AV is a detection, not attribution, engine), the dataset of malware downloads may contain some adware noise. However, in practice AV vendors may be relatively effective at distinguishing between the very broad adware and malware classes. Moreover, for the referenced study, AV labels were used only as a coarse grain filter, and the entire set of malware downloads was manually reviewed.

Over the study period a total of 174,376 executable downloads were recorded and not filtered by the whitelist. 1,064 of them were labeled as malware and 4,472 as adware. The 1,064 malware download traces were manually categorized. After removing duplicates, a set of 533 unique malware downloads remained. Each one of these was manually reviewed, and each one's download path was manually labeled, obtaining a dataset of 164 drive-by and 41 social engineering malware downloads in addition to 328 unique update/drop malware download events.

Figure 4:
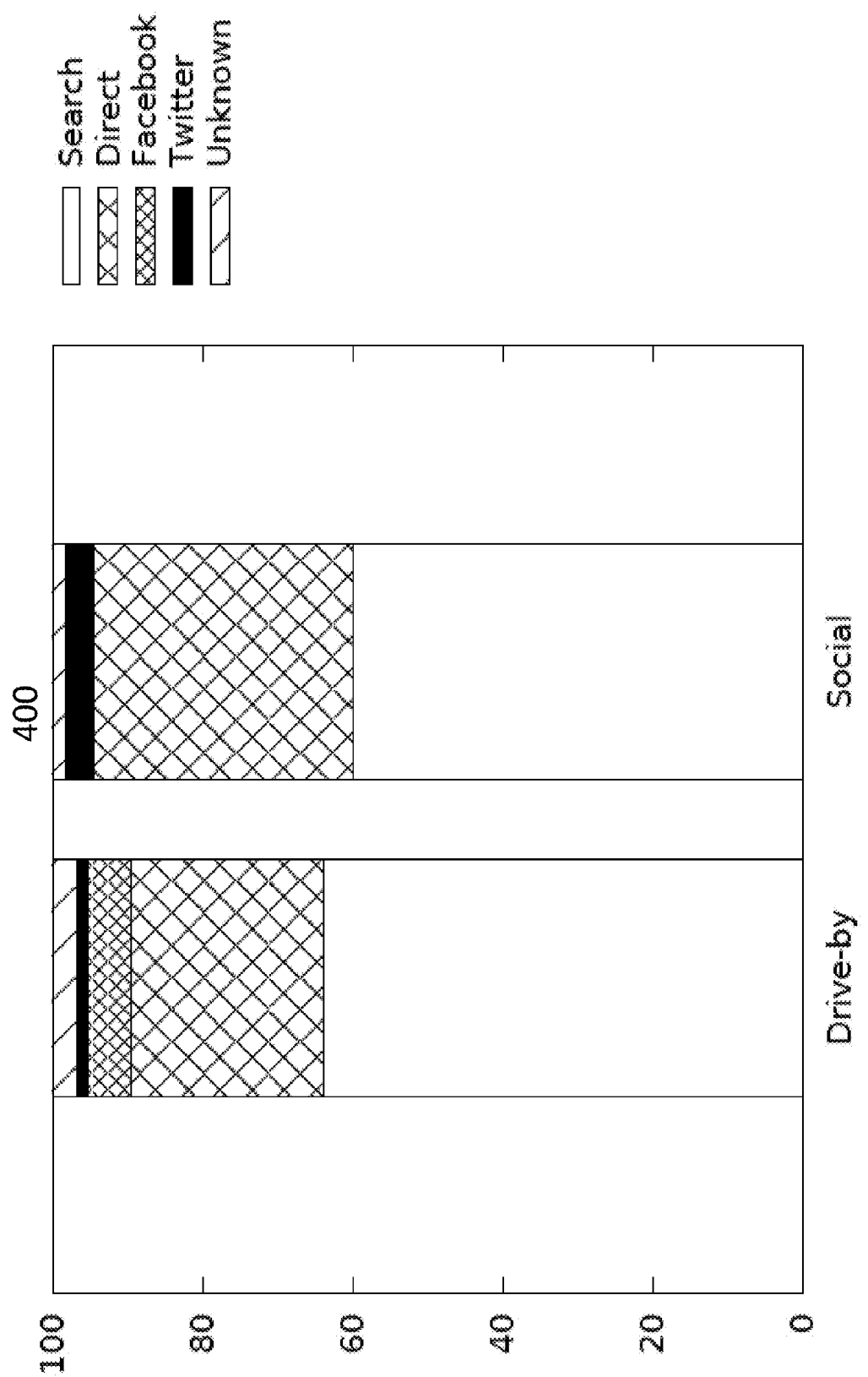
FIG. 4 is an example of observed malicious activity on a network.

FIG. 4 shows a breakdown 400 of the drive-by and social engineering "origins" behind the malware downloads in the example study. In most cases the users started from a search engine page. For drive-by downloads, 64% of the download paths started with a search. The search query keywords were typically very "normal" (e.g., searching for a new car, social events, or simple tools), but unfortunately the search results linked to hacked websites that acted as the "entry point" to exploit distribution sites and malware downloads. For social engineering downloads, about 60% of the web paths started with a search. Search engine queries that eventually led to social engineering attacks tended to be related to less legitimate content. For example, the search queries were often related to free streaming links, pirated movies, or pirated versions of popular expensive software. In these cases, the search results contained links offering content relevant to the search, but the related search result pages would also encourage the user to install malicious software disguised as some required application (e.g., a video codec or a software key generator). The second most common origin for social engineering downloads was direct links, whereby a user arrives to a webpage directly (e.g., by clicking on a link within a spam email), rather than through a link from another site. Many of these direct links point to a benign website that is either hacked or displays malicious ads. Facebook and Twitter represented a relatively infrequent origin for malware downloads (7% and 3% of the cases, respectively). While both Facebook and Twitter may rely on encrypted (HTTPS) communications, it may be possible to determine if a download path originated from their sites by noticing that Facebook makes sure that all external requests carry a generic www.facebook.com referrer, for example. Similarly, requests initiated by clicking on a link published on twitter carry a referrer containing a t.co shortening URL. Only one case in the study involved a link from Facebook or Twitter that led directly to a drive-by exploit kit. In all other cases, the links led first to a legitimate page that was hacked or that displayed a malicious as. The remaining malicious downloads (less than 3% overall) were unable to be traced back to their origin (e.g., due to missing traffic). The data revealed that malicious ads are responsible for a significant fraction of the malware downloads in the dataset. Specifically, malicious ads were included in the web path of about 25% of drive-by and 40% of social engineering malware downloads. The observed malicious ads were typically displayed on relatively unpopular websites. Only one example of a malicious ad served on a website with a US Alexa ranking within the top 500 was observed.

The systems and methods described herein may automatically trace back the sequence of steps (i.e., HTTP transactions) that lead victims to be infected via a malware download. In the case of basic HTTP transactions, reconstructing the web path to infection may be straightforward, because the referrer and location header fields may link subsequent HTTP transactions together. However, malicious download paths may make use of JavaScript, browser plugins, advertisement chains, and/or other techniques. Depending on the particular version of the browser, JavaScript engine, and plugin software running on the client, the referrer and/or location headers may be suppressed, resulting in the inability to correctly reconstruct the entire sequence of download path transactions in the given network trace from header fields alone. However, it may be possible to find surrogate "referrer indicator" features and heuristics that may be used to perform a more complete download path traceback. For example, each of the features observed in the example study are defined below, and a measure of how prevalent the features are for malware download paths is also provided. These features may be to automate the download path traceback as described below in greater detail.

First, the following is a more specific definition of download path traceback. Let Td indicate an HTTP transaction carrying an executable file download initiated by client C. Given the recording of all web traffic generated by C during a time window preceding (and including) Td, we would like to reconstruct the sequence of transactions (T1, T2, . . . , Td) that led to the download while filtering out all unrelated traffic. This sequence of transactions may be the consequence of both explicit user interactions (e.g., a click on a link) and actions taken by the browser during rendering (e.g., following a page redirection). Notice also that the traffic trace may contain a large number of transactions that are completely unrelated to the download path, for example because the user may have multiple browser tabs open and/or multiple web-based applications active in parallel, thus potentially producing a large amount of overlapping unrelated traffic.

Let T1 and T2 be two HTTP transactions. The features/ heuristics listed below may be used to determine whether T1 is a likely "source of" T2, therefore T1 and T2 to be "linked" with different levels of confidence. Table I summarizes the prevalence of each feature in both drive-by and social engineering downloads. Table I illustrates success rates of traceback method and "source-of" relationships in malware download paths. The numbers indicate the percentage of analyzed download paths. A detailed discussion of how these features may be used for automated download path traceback is given below.

(1) Location: According to RFC2616, if transaction T2's URL matches T1's location header, this may indicate that T2 was reached as a consequence of a server redirection from T1.

(2) Referrer: Similarly, if T1's URL matches T2's referrer header, this may indicate that the request for T2 originated (either directly or through a redirection sequence) from T1, for example as a consequence of page rendering, a click on a hyperlink, etc.

(3) Domain-in-URL: Advertisement URLs may embed the URL of the page that displayed the ad. Consequently, if T1's domain name (or IP address) is "embedded" in T2's URL, it may be likely that T1 was the "source" of the request, even though the referrer is not present. This may be especially valid if there is only a small time gap between the two transactions.

(4) URL-in-Content: If T1's response content includes T2's URL (e.g., within an HTML <a> tag or simple non-obfuscated JavaScript code), this may indicate there is potentially a "source of" relationship that links T1 to T2.

(5) Same-Domain: Exploit code and the malware executable file itself may be served from the same domain. This approach may be chosen by the attackers because if the exploit is successfully served, it means that the related malicious domain is currently reachable, and serving the malware file from the same domain may help guarantee a successful infection. Therefore, if T1 and T2 share the same domain name and are close in time, this may indicate that T1 is the "source of" T2.

(6) Same-e2LD: In a similar way, if T1 and T2 are close in time and share the same effective second level domain name (e2LD), this may indicate a possible "source of" relationship analogous to rule (5), though with lower likelihood in the example study, as shown by the results in Table I.

(7) Commonly Exploitable Content (CEC): Many drive-by downloads and/or other attacks may use commonly exploitable content (e.g., .jar, .swf, and/or .pdf files carrying exploits) to compromise victims. The exploit may download a malicious executable. Therefore, if T1 contains CEC and T2 is an executable download occurring immediately after T1 (e.g., less than a second or some other time period of interest), this may indicate that T1 is the source of T2.

(8) Ad-to-Ad: In some cases, sequences of ad-related transactions where the referrer and location header are missing (e.g., due to JavaScript or plugin-driven redirections) may be observed. Therefore, if T1 and T2 are consecutive ad-related requests (e.g., identified by matching their URLs against a large list of known ad-distribution sites), and were issued within a small time delta (e.g., less than a second), this may indicate there may be a "source of" relationship.

TABLE I

| | Drive-by | Social engineering |
|---|---|---|
| Trackback method success rate | | |
| Only Referrer and Location | 0% | 53% |
| All surrogate referrer features | 96% | 95% |
| Feature | | |
| Location | 69% | 73% |
| Referrer | 97% | 100% |
| Domain in URL | 0% | 5% |
| URL in content | 17% | 17% |
| Same domain | 97% | 20% |
| Same e2LD | 6% | 7% |
| CEC | 5% | 0% |
| Ad to ad | 6% | 10% |

As mentioned earlier, 164 drive-by and 41 social engineering malware downloads were manually reviewed and labeled during the example study. Table II summarizes the prevalence of a variety of characteristics observed in the different types of paths. In particular, some of these characteristics may be leveraged as statistical features to build a classifier that automatically distinguishes between drive-by and social engineering paths as described below. Characteristics of malware updates/drops that may be used to filter out download paths that belong neither to the drive-by nor to the social-engineering class are also described.

TABLE II

| Feature | Drive-by | Social engineering |
|---|---|---|
| Download referrer | 0.6% | 95% |
| Candidate exploit domain age | 0 | — |
| Drive-by URL similarity | 69% | 0% |
| Download domain recurrence | 0.6% | 34% |
| Download path length | 6 | 7 |
| User agent popularity | 95% | 98% |

(1) Download Referrer: In case of social engineering attacks, the HTTP transaction that delivers the malicious file download may carry a referrer due to the direct user interaction (e.g., clicking on a link to start the download) that characterizes them. On the other hand, in the case of drive-by attacks, the malware file delivery may happen via a browser exploit, and the related transaction often may not contain the referrer header. Similarly, malware updates/ drops initiated by malicious applications that are already running on a compromised machine may not carry any referrer information. Table II shows that only 0.6% of all drive-by paths in the example study carried a referrer in the final download node, whereas 95% of social engineering paths carried the referrer in the download node.

(2) Candidate Exploit Domain "Age": Drive-by download attacks may exploit their victims by delivering exploits via files of different content type, such as .jar, .swf, or .pdf files. For example, during the example study, 94% of the drive-by download paths at some point (i.e., at some node along the path) delivered the exploit via "commonly exploitable" content (i.e., .jar, .swf, .pdf, etc.). The domains serving these exploits may be short-lived (i.e., registered or active for a very short time) compared to domains serving benign content of the same type. Therefore, a file of commonly exploitable content type served from a recently registered domain may be an indicator of a possible drive-by download path. On the other hand, none of the social engineering download paths observed during the study had this property. Table II reports the median domain name "age", computed as the number of days of activities for the domain of a page serving commonly exploitable content, measured over a very large passive DNS database. The median age is less than one day for drive-by paths, and is not indicated for social engineering paths, because none of the nodes in the social engineering path served content of the "commonly exploitable" type (the overall traffic traces included HTTP transactions that carried such content, such as .swf files, but none of those were in-path between the root and the malware download node).

(3) Drive-by URL Similarity: Many drive-by downloads (e.g., about 70% of the observations in the example study) may be served by a small number of exploit kits. Therefore, in many cases the exploit delivery URLs included in drive-by download paths may share a structural URL similarity to known exploit kit URLs. Table II reports the fraction of drive-by download paths that had a similarity to known exploit kit URLs.

(4) Download Domain Recurrence: Many domains serving drive-by and social engineering malware download may be contacted rarely, and often only once by one particular client at the time of the attack. On the other hand, malicious software may regularly check for executable updates. To approximately capture this intuition, the number of queries to the malware download domain (i.e., the last node in the path) may be measured. As shown in Table II, only 0.6% of the malware download domains in the example drive-by paths are queried several times within a small time window (two days, in the example study). The higher percentage of social engineering malware path with download domain recurrence may be due to the fact that a significant fraction of these attacks may use free file sharing websites for malware downloads, and that the domain query occurrences may be counted in aggregate, rather than per client. These above observations, in combination with other features, may be used to help identify and discard malware download paths that are neither drive-by nor social engineering paths.

(5) Download Path Length: Drive-by and social engineering attacks may generate download paths including several nodes, for example because a user may have to first browse to a site that eventually leads to the actual attack. In addition, the malware distribution infrastructure may be built in such ways that enables malware downloads "as a service", which entails the use of a number of "redirection" steps. Download paths related to malware updates or drops may be very short (e.g., they may contain only one request). Table II reports the median number of nodes for drive-by and social engineering paths. In case of malware updates/drops, the median length for the path was only one node.

(6) User-Agent Popularity: The download paths for both drive-by and social engineering downloads may include several nodes that report a popular browser user-agent string, as the victims may use their browser to reach the attack. On the other hand, in many cases of a malware drop/update, the update software makes the requests, rather than the browser. In the example study, the majority of observed malware update download paths did not report a popular user-agent string (only 36% of them did). Table II reports the number of drive-by and social-engineering paths that include a popular user-agent string.

Malware Path Detection and Countermeasure Systems

The above-described characteristics of in-the-wild malware download paths may enable automation of the systematic reconstruction and investigation of malware download events. This capability may allow collection of an always up-to-date dataset of in-the-wild malware downloads and design of new and more effective defense mechanisms.

One goal of the malware path detection and countermeasure system 100 may be to automatically provide context to malicious download events. By automatically collecting and categorizing different types of download paths, the system 100 may derive large and continuously updated labeled datasets of malware download paths caused by different types of attacks, including social engineering and drive-by attacks. These datasets may constitute a fundamental building block to developing new defenses that may mitigate or prevent future attacks. Given a traffic trace that includes all web traffic recorded during a time window preceding and including an event such as a malware download, a web path leading to the event may be automatically traced back and categorized.

Figure 5:
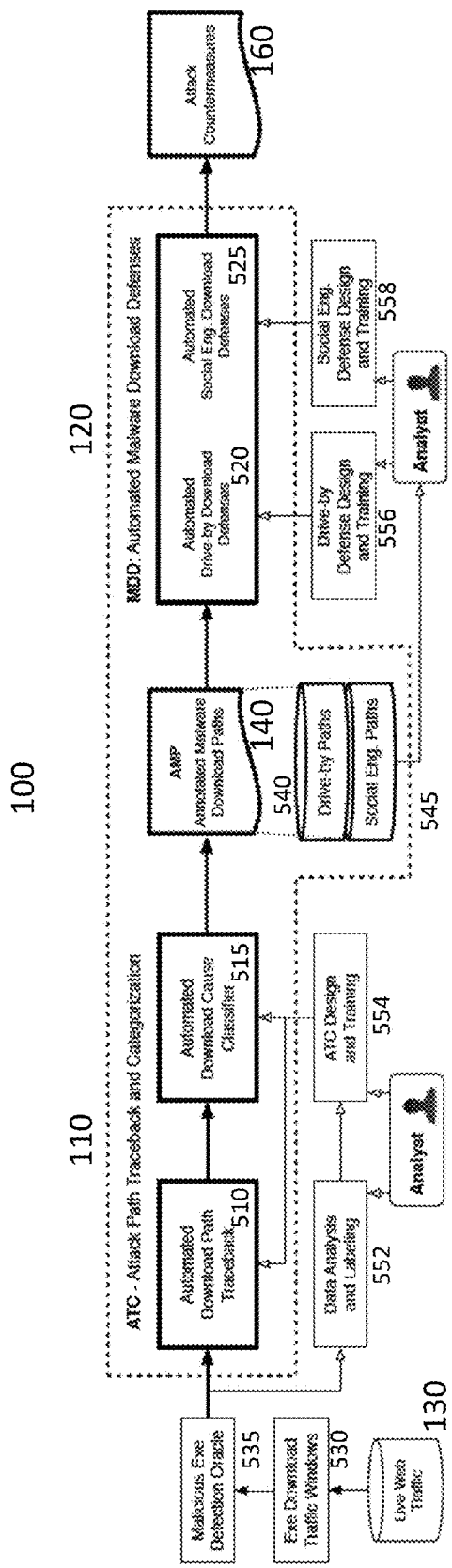
FIG. 5 is a malware path detection and countermeasure system according to an embodiment of the invention.

FIG. 5 shows additional details of the malware path detection and countermeasure system 100. As mentioned earlier, the system 100 may include two modules, an ATC module 110 and an MDD module 120, and may receive data collected from live web traffic 130. One example of data collected from live web traffic 130 may be input download traffic traces 530. Let A be a client machine that downloads an executable file at time t. The system 100 may collect all HTTP traffic generated by A within a time window T preceding (and including) the download time t. While the download traces are collected from live traffic in this example, the system 100 may also work on "offline" traffic traces provided by third-party tools in some embodiments. Note that the traffic traces 530 may contain not only network traffic related to the executable download events, but also a significant amount of traffic that is unrelated to the download event. For example, users may keep multiple browser tabs open and run other network applications in the background at the same time, thus generating unrelated traffic within the same time window T in which the download occurred. Furthermore, the traffic gathered may be related to downloads that may or may not be malicious. Download traces may be gathered related to any executable file download. Afterwards, the event may be analyzed to determine whether it is of interest.

To identify executable download events of interest, the system 100 may make use of a third-party malicious execution detection oracle 535 that can distinguish between malicious and benign executable files. For example, there exists an entire line of research dedicated to detection of malicious executable files that may be leveraged to build an oracle 535. In some embodiments the oracle 535 may comprise one or multiple AV scanners. In some embodiments, the oracle 535 may not be a third party element, but may instead be integrated into the system 100. Even if the oracle 535 may fail to detect some malicious files, the system 100 may still provide significant benefits. For example, given a subset of download traces flagged as malware-related by the oracle 535, the system 100 may reconstruct their download paths and extract information that may be generalized and successfully used to prevent future malware downloads, even if the new downloaded files are not detected by the oracle 535, as described below.

Given a network trace including all traffic "around" a malicious download event, the ATC module 110 may include the following sub-modules: (i) an automated download path traceback module 510 that may automatically trace back the sequence of HTTP transactions related to the download web path, thus filtering out all traffic unrelated to the download event; and (ii) an automated download cause classifier module 515 that may automatically label the cause of a malicious download (i.e., the "reason" or type of attack that initiated the download) as either social engineering or drive-by.

The labeled in-the-wild malicious download paths collected during the initial study described above, or collected in some other way, may be used to derive a set of features and heuristics that may allow for accurate automatic trace back. Details of an example traceback algorithm are described below.

After a malware download path has been reconstructed, being able to automatically label the cause of malicious downloads may allow the continuous collecting of new examples of different types of in-the-wild malware download paths 552. In turn, these always up-to-date datasets of automatically labeled download paths may be leveraged to design and train new malware defense modules 554. In one example embodiment, to automate the download path labeling process, a supervised learning approach may be used. Using the collected labeled data, a number of statistical features may be engineered that may allow for separating download paths related to social engineering attacks, drive-by downloads, and malware updates. A statistical classifier may be trained to automatically assign new malware download paths to one of these classes. The output of the ATC module 110 may be annotated malware download paths (AMP) 140, which may include drive-by paths 540 and social engineering paths 545.

Different types of attacks may have different characteristics and may be best countered by different defense approaches. The AMPs 140 output by the ATC module 110 may allow for collecting large datasets of malware download paths caused by different types of attacks. This may provide a fundamental building block for studying new and evolving attack mechanics and for developing more effective countermeasures. The AMPs 140 may be used in two phases: (a) the design and training of drive-by defense modules 556 and social engineering defense modules 558, and (b) a direct feed to the defense modules to automatically produce attack countermeasures 160. As new defense modules are developed 556, 558, they may be plugged into the MDD module 120, which may include two sub-modules: a drive-by defense module 520 and a social engineering defense module 525.

For example, an automated defense against drive-by downloads may be based on malicious code injections. Given a drive-by malware download path labeled by the ATC module 110, a classifier may be built that can further label the nodes within the path to identify the landing (or "hacked") page, the code injection page, the exploit page, and the download page itself. This may allow automatic identification of the domain name related to the code injection. As shown below, these domains may be more long-lived compared to the domains related to the exploit and download pages. The countermeasure 160 for this type of attack may include automatic identification and prompt blacklisting of the injection domains.

ATC Modules

As shown in FIG. 5, the ATC module 110 may include two sub-modules: the download path traceback module 510 and the download cause classifier module 515. The following section explains how these sub-modules may work in some embodiments of the invention.

Given a malicious file download from a given client A, the download path traceback module 510 may trace back the web path consisting of the sequence of web pages visited by the user that led her to a malware download attack (e.g., via social engineering or to a drive-by exploit).

The analysis may start from a network trace containing all web traffic produced by client A during a time window preceding (and including) the download. This trace may contain many HTTP transactions that are unrelated to the web path followed by the user to arrive from an origin page to the download event. In addition, it may not always be possible to correctly link two related consecutive HTTP transactions by simply leveraging their HTTP referrer headers, as discussed above. To mitigate some of the limitations of referrer-only approaches and more accurately trace back the download path, the download path traceback module 510 may employ an algorithm that leverages the features and heuristics derived from the above-described study. A transactions graph, where nodes are HTTP transactions within the download trace, and edges connect transactions according to a "probable source of" relationship (explained in detail below) may be built. Then, starting from the node (i.e., the HTTP transaction) related to the malware file download, the download path traceback module 510 may walk back along the most probable edges until it finds a node with no predecessor, which may be labeled as the root of the download path.

The following traceback algorithm may be used to build the transactions graph in some embodiments. Let D be the dataset of HTTP traffic generated by A before (and including) the download event. The download path traceback module 510 may start by considering all HTTP transactions in D and constructing a weighted directed graph $G=(V, E)$, where the vertices are A's HTTP transactions, and the edges represent the relation "probable source of" for pairs of HTTP transactions. As an example, the edge $e=(v1 \rightarrow v2)$ may imply that HTTP transaction v1 likely produced HTTP transaction v2, either automatically (e.g., via a server-imposed redirection, JavaScript, etc.) or through explicit user interaction (e.g., via a hyperlink click). Therefore, v1 may be considered to be the "source of" v2. Each edge has a weight that may express the level of confidence for the "link" between two nodes. For example, the higher the weight assigned to $e=(v1 \rightarrow v2)$, the stronger the available evidence in support of the conclusion that v1 is the "source of" v2. Also, let t1 and t2 be the timestamp of v1 and v2, respectively. Regardless of any available evidence for a possible edge, the two nodes may be linked only if $t1 \leq t2$.

To build the graph G and draw its edges, the download path traceback module 410 may leverage the seven features discussed with respect to Table I above. Specifically, given two nodes (essentially two URLs) in the directed graph G, an edge $e=(v1 \rightarrow v2)$ may be created if any of the seven features is satisfied. For example, if v1 and v2 can be related via the "Domain-in-URL" feature, an edge may be drawn between the two nodes. A weight may be assigned to each of the seven features; the "stronger" the feature, the higher its weight. For example, a weight value $We=7$ may be assigned to the "Location" feature, $We=6$ to the "Referrer" feature, and so on, with the "Ad-to-Ad" receiving a weight $We=1$. The actual absolute value of the weights may be irrelevant. The weight values may be assigned to express relative importance and precedence among the edges to be considered by a greedy algorithm. If more than one feature happens to link two nodes, the edge may be assigned a weight equal to the maximum weight among the matching features.

Figure 6:
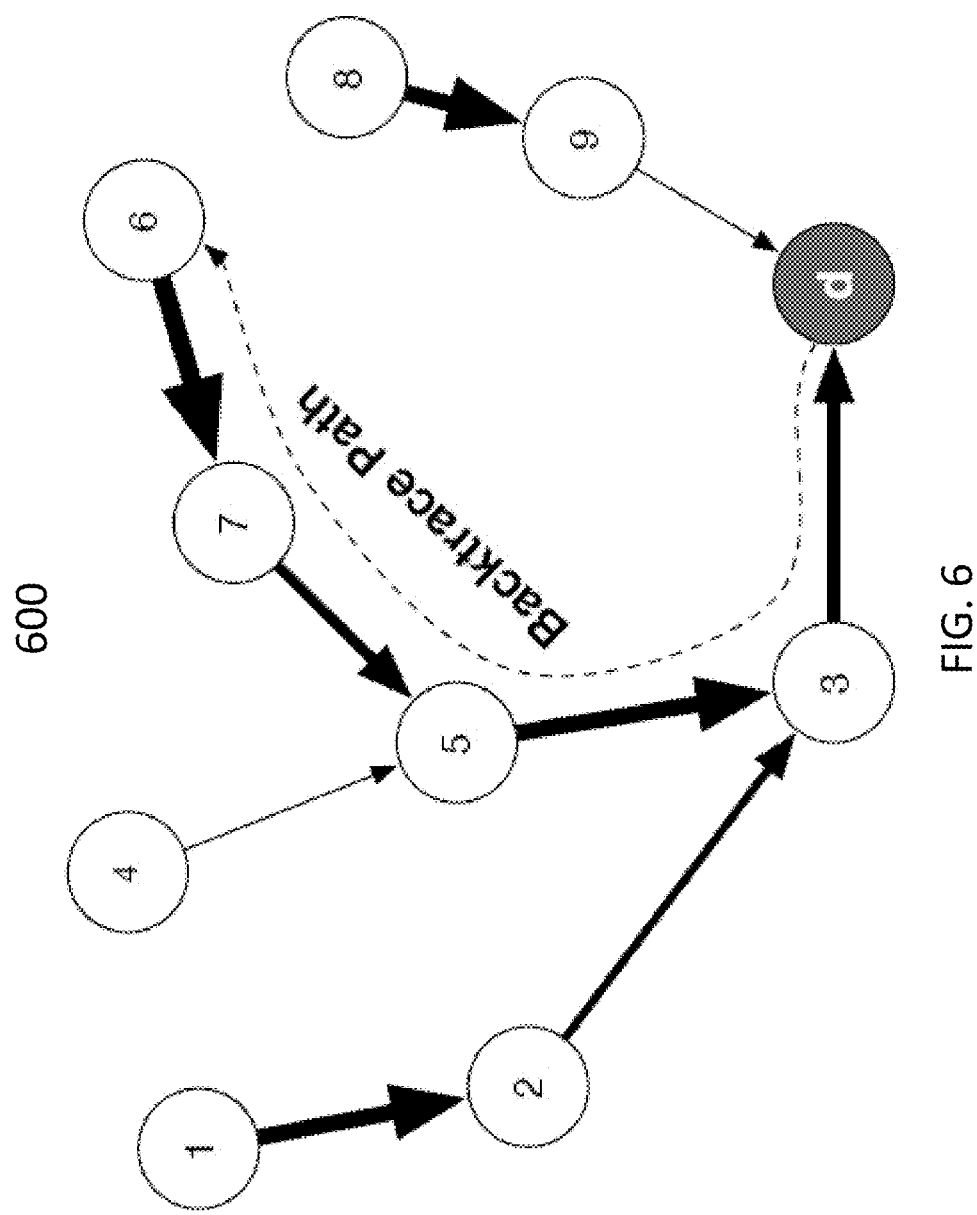
FIG. 6 is a weighted directed graph according to an embodiment of the invention.

Once G has been built, the download path traceback module 510 may use a greedy algorithm to construct an approximate "backtrace path". The download path traceback module 510 may start from the graph node related to the executable download event and walk backwards on the graph by always choosing the next edge with the highest weight. FIG. 6 is a weighted directed graph 600 example according to an embodiment of the invention, in which thicker edges have a higher weight. The download path traceback module 510 may start from the download node d. At every step, the download path traceback module 510 may walk one node backwards following the highest weight edge. Ties between edges with equal highest weight may be broken by choosing the edge connecting the two nodes (i.e., the two HTTP transactions) that are closest in time. The download path traceback module 510 may proceed until a node with no predecessor is reached, which may be marked as the origin of the download path. If a node has more than one predecessor whose edges have the same weight, the download path traceback module 510 may follow the edge related to the predecessor node with the smaller time gap to the current node (e.g., measured with respect to the timestamp of the HTTP transactions related to each node).

The heuristics stated above, along with the greedy algorithm for reconstructing the trackback path, may both add false edges to the graph or miss some edges. However, these challenges may be mitigated and/or eliminated by the following observations:

i) The aforementioned algorithm and heuristics may aim to solve a much narrower problem than finding the correct "link" between all possible HTTP transactions in a network trace, because they may only be tasked with tracing back a sequence of HTTP transactions that terminate into a malicious executable download.

ii) The "false edge" problem may be mitigated by the fact that the download path traceback module 510 may always follow the strongest evidence. For example, consider FIG. 6. Suppose the edge (2→3) was drawn due to same e2LD, while edge (5→3) was drawn due to same referrer. In this case, even though edge (2→3) may have been mistakenly drawn (i.e., nodes 2 and 3 have no real "source of" relationship), the mistake may be irrelevant, because the algorithm may choose (5→3) as part of the traceback path, which may be supported by stronger evidence (a matching referrer field).

iii) The algorithm may output not only the sequence of HTTP transactions, but also the nature (and confidence) of every edge. Therefore, a threat analyst (or a downstream post processing system) may take the edge weights into account before the backtrace path is used to make further decisions (e.g., remediation or takedown of certain domains in the download path).

As discussed further below, the empirically derived features explained above may work very well in practice, and the algorithm may exhibit high accuracy when tested against manually reconstructed real-world malware download paths.

After the download path has been traced, the download cause classifier module 515 may label the reconstructed path as either social engineering or drive-by download. As discussed above and shown in FIG. 5, the output of this classification may provide annotated malware download paths (AMPs) 140, which may be provided as input to the defense module (MDD) 120.

While the download cause classifier module 515 example discussed herein may be mainly interested in automatically identifying social engineering and drive-by download paths, a three-class classifier 515 that can distinguish between three broad download causes, namely social engineering, drive-by, and update/drop, may be provided in some embodiments. Essentially the update/drop class may allow the system 100 to identify and exclude malware downloads that are not caused by either social engineering or drive-by attacks.

To discriminate between the three different classes, statistical features may be employed that reflect, with a one-to-one mapping, the characteristics of drive-by and social-engineering malware download paths described above. In some embodiments, six statistical features may be used to reflect six characteristics. For example, a binary feature that is true if the HTTP request that initiated the download has a referrer header (e.g., "Download Referrer") may be measured, as may a feature that measures the "age" of domains serving "commonly exploitable" content, such as .jar, .swf, or .pdf files (e.g., "Exploit Domain Age"), etc.

To train the download cause classifier module 515, a dataset of in-the-wild malware download paths may be used, such as that collected and manually labeled during the initial study described above.

The download cause classifier module 515 may be built and/or programmed based on the features and training datasets. For example, in some embodiments a random forest algorithm may be used to create the download cause classifier module 515.

MDD Modules

The AMPs 140 produced by the ATC module 110 may provide a large and up-to-date dataset of real-world malware download incidents, including the web path followed by the victims. This information may be used to study new attack trends and develop more effective malware defenses. As new defenses are developed, they may be plugged into the MDD module 120, so that as new malware download paths are discovered, appropriate countermeasures 160 may be automatically derived.

As an example that demonstrates how the system 100 may enable the development of more effective malware download defenses, a possible defense against drive-by download attacks based on code injections is described. Many code injection attack defenses rely mainly on blacklisting the URLs serving the actual drive-by exploit or malware download, rather than blocking the URLs from which malicious codes are injected. As shown in the following example, by automatically tracing back drive-by download paths and identifying the code injection URLs, the system 100 may enable better defenses against future malware download attacks.

Figure 7:
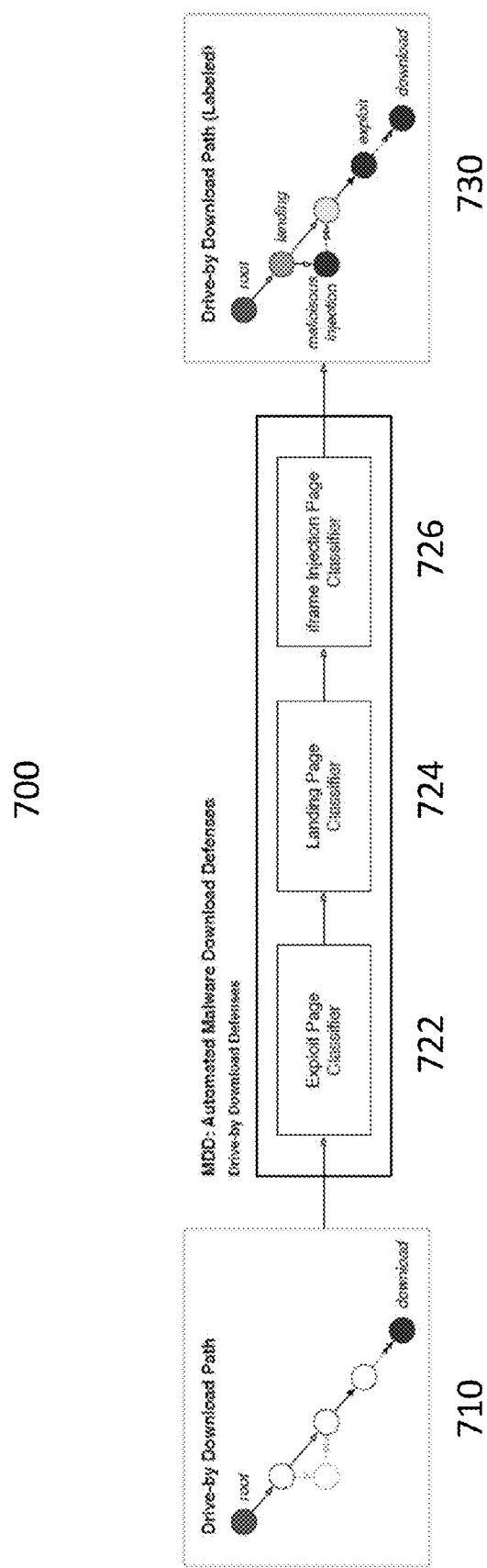
FIG. 7 is a node detection process according to an embodiment of the invention.

FIG. 7 is a node detection process 700 according to an embodiment of the invention. Given a malware download path 710 that was reconstructed and labeled as drive-by by the ATC module 110, the MDD module 120 may automatically identify the landing, injection, and exploit nodes 730 within the download path. This may be done using a supervised classification approach. For example, a separate classifier module may be trained for each of the three type of nodes in a drive-by malware download path: one classifier that focuses on identifying the exploit URL 722, one that identifies the landing page 724, and one that identifies the injection URL 726. As discussed in greater detail below, the set of candidate exploit pages may be generated by the exploit page classifier 722 and fed to the landing page classifier 724. The landing page classifier 724 may examine the candidate exploit pages to measure some features that may identify candidate landing pages. Similarly, the candidate landing pages may be fed to the code injection page classifier 726. The final output of the MDD module 120 may be a fully labeled drive-by download path 730.

The exploit classifier module 722 may take in as input a drive-by download path 710 and may label its nodes as exploit or non-exploit. An exploit node may be as a page that carries content that exploits a vulnerability on the victim's machine, causing it to eventually download a malicious executable. The search for exploit nodes may proceed "backwards", starting from the node prior to the executable download and ending at the root. There may be more than one exploit node in the path (sometimes several exploits are tried before success). Therefore, more than one node may be assigned the exploit label.

The following features may be used to build the exploit classifier module 722, for example.

1) Hops to the download page: A number of nodes on the download path between the node and the download node may be determined. A download node may only be a few hops away from the node in some cases. In many cases, the node prior to the download may be an exploit because once the exploit succeeds the executable may be downloaded immediately.

2) Commonly exploitable content: "Commonly exploitable" content may be a Boolean feature that indicates if a node contains content for Java, Silverlight, Flash, Adobe Reader, or other commonly exploitable software. Browser plug-ins may be exploitation vectors, for example. Exploits are often delivered though their content.

3) Domain age: The number of days (or other unit of time) since the first observation of the node's effective second level domain in passive DNS may be determined. Exploit domains may be short-lived and often only active for one day, for example.

4) Same domain: Same domain may be a Boolean feature that is true if the node's domain is equal to the download domain. Exploits and downloads may be served by the same domain in many cases.

Once the exploit node(s) is labeled, the landing page classifier module 724 may attempt to locate the landing page URL. A landing page may be the web page where the drive-by attack path begins. Often, the landing page itself is a non-malicious page that was previously compromised (or "hacked"). The landing page classifier module 724 may calculate the probability that a node preceding the exploit URL is a landing page. Nodes with a probability higher than a tunable detection threshold (e.g., 50%) may be classified as "candidate landing" nodes. If there are multiple candidates, the one with the highest probability may be labeled as the landing node.

To label a node as either landing or non-landing, the landing page classifier module 724 may use the following statistical features, for example.

1) Hops to the exploit page: This feature set may include the number of non-redirect nodes and unique effective second level domains between the node and the exploit node. In some cases, all the nodes between the landing and exploit node may be redirects. Also, many drive-by downloads may use one to three malicious domains (injection, exploit, download). Therefore, in many cases there may be zero or one domains (the one being the injection domain) on the download path between the landing and exploit nodes.

2) Domain age: Two features may use domain age. One feature is the age of the node's effective second level domain in passive DNS. The domains of landing pages may be greater than a year in age in many cases. Older landing pages may be likely to have more vulnerabilities due to old software and may attract more visitors (i.e., potential victims) because it may take time for a site to become popular. A second feature is the age of the oldest domain between the node and the exploit node. Nodes on the download path between the landing and exploit nodes may be less than a year in age in many cases. This is because they may be malicious and recently registered.

3) Redirect: Redirect may be a Boolean feature that indicates if the node is an HTTP redirect. The landing page cannot be on a redirect chain that leads to an exploit in many cases. By the definition used by the MDD module 120 in this example embodiment, the landing page must also serve benign content. Otherwise it may be considered a malicious page, and the landing page classifier module 724 may label the page that led the user to it as the landing page.

4) Same domain. Same domain may be a Boolean feature that may be true if the node's domain is equal to the exploit domain. It may be uncommon for an exploit to be served by a same domain as the exploit. The domains may be kept separate because installing an exploit kit on a compromised website may increase the likelihood of detection by the site's webmaster. In addition, it may be easier to manage a centralized exploit kit server than keep all the compromised websites up-to-date with the latest exploits.

The injection page may be the source of the code inserted into the "hacked" landing page. In many cases, the injection and exploit nodes are separate and are served via different domain names. This may provide a level of indirection that allows the exploit domain to change without requiring an update to the landing page (e.g., by re-hacking it to inject a different code). The injection node by definition may be a successor to the landing page, but depending on the injection technique it may or may not be directly present in the download path traced back by the ATC module 110 (e.g., node (C) in the example of FIG. 3 may remain outside of the reconstructed path, due to ATC's greedy traceback algorithm). Therefore, the injection page classifier 726 may calculate the injection page probability for each successor of the landing node in the entire transactions graph instead of only considering nodes in the reconstructed download path. The successor of the landing page node with the highest probability may be labeled as the injection page node.

To identify the injection page, for each successor of the landing node the injection page classifier 726 may measure the following features.

1) On path: On path may be a Boolean feature that indicates if the node is on the download path. Being on the download path and a successor of the landing page may make a node a good candidate for the injection node. However, the injection node may not always be on the download path due to the structure of some drive-by downloads, as discussed above.

2) Advertisement: Advertisement may be a Boolean feature that is true if the node is an ad. By definition, the injection page is not an ad, but may include code injected into the landing page. Ads unrelated to a malicious download may be served on the landing page. This feature may help exclude the ad nodes.

3) Domain age. The number of days since the first observation of the node's effective second level domain in passive DNS may be determined. Injection pages may often be malicious pages set up for the purpose of injecting malicious code. Injection code may be rarely hosted directly on compromised pages, because this may expose the code to cleanup by the legitimate site owner, thereby ending the attacker's ability to exploit visitors. Injection pages that are malicious may tend to be young domains, but older than exploit-only domains, because they may often be used for the lifetime of the website compromise.

4) Successors. At least two features may be derived from the node's successors. One may be the number of direct successors. Injection nodes may often have only one. Injection nodes may typically perform an HTTP redirect or dynamically update the DOM to include the URL of the exploit domain. Benign pages may often have more than one direct successor because they may load content from many different files or sources. Another feature may be Boolean and may be true if one of the node's successors is on the download path. This feature may indicate there is a possible "source of" relationship between the node and a node on the download path, even if the node itself is not on the download path.

5) Same domain. There may be at least two Boolean features that compare domain names. One may check for equality between the node's domain and the landing domain. It may be uncommon for the landing domain to equal the injection domain for reasons similar to those described in the landing page classifier's "same domain" feature above. The feature may compare the node's domain to the exploit domain. The exploit and injection domains were the same in approximately 30% of the observations in the example study presented above.

Networks Including Malware Path Detection and Countermeasure Systems

Figure 8:
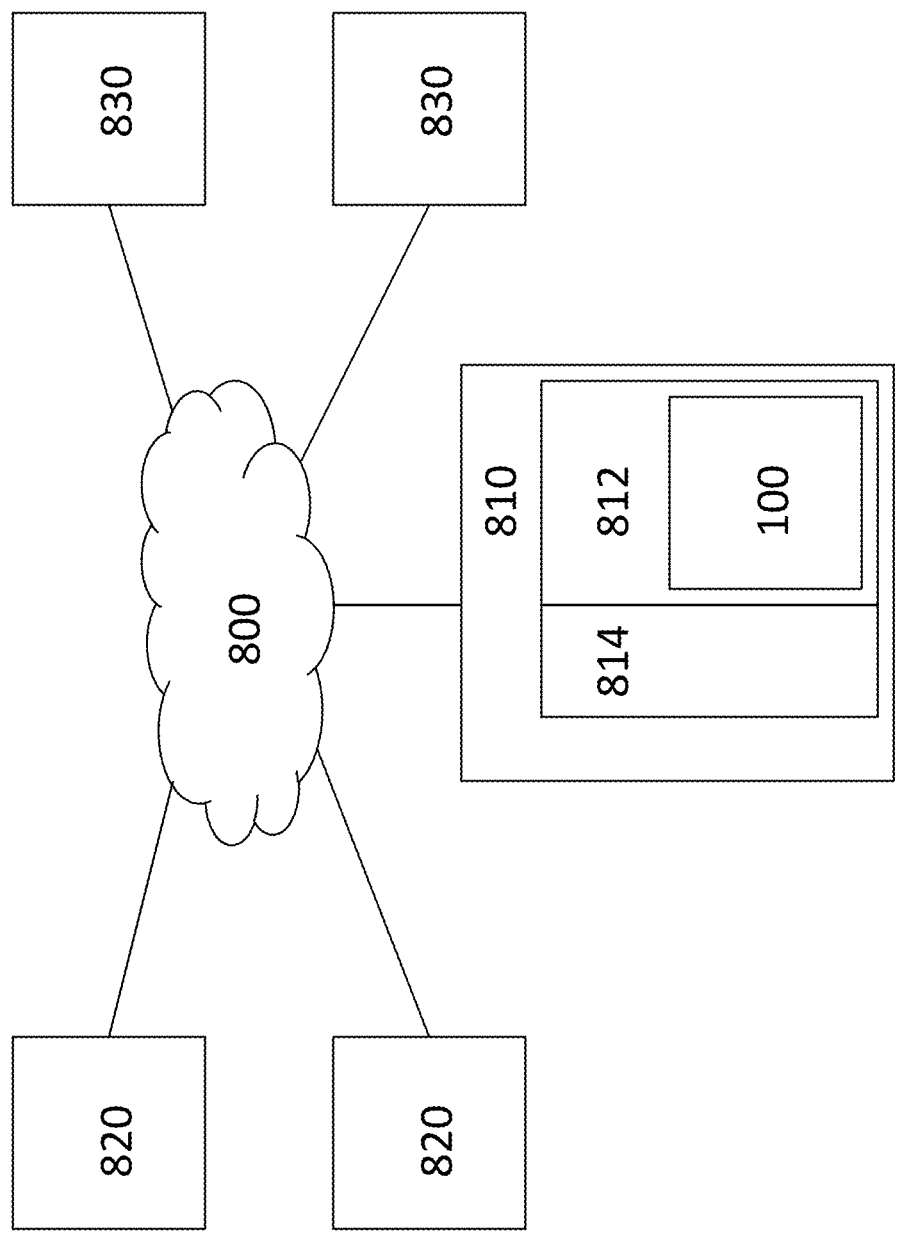
FIG. 8 is a network including a malware path detection and countermeasure system according to an embodiment of the invention.

FIG. 8 is a network 800 including a malware path detection and countermeasure system 100 according to an embodiment of the invention. The system 100 may be implemented in hardware, software, and/or firmware by one or more computers 810 comprising one or more processors 812 and one or more memories 814. The system 100 and computer 810 may be in communication with one or more networks 800, for example the Internet, a local network, and/or an enterprise network. The system 100 may monitor traffic on the network 800, for example traffic between one or more computers 820 (e.g., personal computers, smartphones, tablets, etc. that may be affected by malware as described above) and one or more servers 830 (e.g., web servers or internal network servers that may install exploits on the computers 820 as described above). By monitoring the network 800 traffic, the system 100 may be able to perform the detection processes discussed above. Because the system 100 may be in communication with the computers 820 and servers 830 via the network 800, the system 100 may be able to distribute the countermeasures 140 it may generate as described above.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures that highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A system for event path traceback comprising:
at least one processor; and
a data storage device having computer readable program code embodied therewith;
the at least one processor configured to execute the computer readable program code to perform processing associated with receiving network traffic from a network; and
an attack path traceback and categorization module in communication with the at least one processor, the attack path traceback and categorization module being configured to perform processing associated with identifying an event within the network traffic;
tracing a sequence of network transactions related to the event; and
outputting an annotated malware path including data about the event and the sequence of network transactions related to the event;
wherein performing processing associated with tracing the sequence of network transactions comprises:
reconstructing a sequence of transactions within the network traffic that led to the event based on a download referrer, at least one surrogate referrer indicator, and at least one of a drive-by uniform resource identifier similarity and a download domain recurrence, wherein the at least one surrogate referrer indicator is not the download referrer, and
filtering out unrelated traffic within the network traffic.

2. The system of claim 1, wherein the attack path traceback and categorization module is further configured to perform processing associated with determining a cause of the event based on the sequence of network transactions.

3. The system of claim 2, wherein the cause is an update, a social engineering attack, or a drive-by download.

4. The system of claim 2, wherein the at least one surrogate referrer indicator comprises at least one of:
a candidate exploit domain age;
a download path length; and
a user agent popularity.

5. The system of claim 1, wherein performing processing associated with identifying the event comprises detecting the event within the network traffic and other network traffic conducted by a computer on the network affected by the event within a period of time near the event.

6. The system of claim 1, wherein performing processing associated with outputting the annotated malware path comprises automatically labeling at least one node within the sequence.

7. The system of claim 6, wherein performing processing associated with outputting the annotated malware path further comprises adding each node to the annotated malware path.

8. The system of claim 1, wherein performing processing associated with tracing the sequence of network transactions comprises analyzing at least one of the following features of at least two nodes of the network traffic:
location;
referrer;
domain in uniform resource identifier;
uniform resource identifier in content;
same domain;
commonly exploitable content; and
same effective second level domains.

9. The system of claim 1, further comprising a malware download defense module in communication with the processor, the malware download defense module being configured to perform processing associated with receiving the annotated malware path and creating a countermeasure based on statistical data in the annotated malware path.

10. The system of claim 9, wherein performing processing associated with creating the countermeasure comprises identifying a landing node, an injection node, and an exploit node for an event within the annotated malware path, wherein the event is caused by a drive-by download.

11. The system of claim 9, wherein performing processing associated with creating the countermeasure comprises generating a report for display, the report comprising at least a portion of the annotated malware path.

12. The system of claim 9, wherein the malware download defense module is further configured to perform processing associated with training a new malware download defense module based on the created countermeasure.

13. A method for event path traceback comprising:
performing processing associated with receiving, with a processor, network traffic from a network;
performing processing associated with identifying, with an attack path traceback and categorization module in communication with the processor, an event within the network traffic;
performing processing associated with tracing, with the attack path traceback and categorization module, a sequence of network transactions related to the event; and
performing processing associated with outputting, with the attack path traceback and categorization module, an annotated malware path including data about the event and the sequence of network transactions related to the event;
wherein performing processing associated with tracing the sequence of network transactions comprises:
performing processing associated with reconstructing a sequence of transactions within the network traffic that led to the event based on a download referrer, at least one surrogate referrer indicator and at least one of a drive-by uniform resource identifier similarity and a download domain recurrence, wherein the at least one surrogate referrer indicator is not the download referrer, and
filtering out unrelated traffic within the network traffic.

14. The method of claim 13, wherein the event is caused by an executable download on a computer on the network.

15. The method of claim 14, further comprising performing processing associated with determining, with the attack path traceback and categorization module, a cause of the event based on the sequence of network transactions.

16. The method of claim 15, wherein the cause is an update, a social engineering attack, or a drive-by download.

17. The method of claim 15, wherein the at least one surrogate referrer indicator at least one of:
a candidate exploit domain age;
a download path length; and
a user agent popularity.

18. The method of claim 13, wherein performing processing associated with identifying the event comprises detecting the event within the network traffic and other network traffic conducted by a computer on the network affected by the event within a period of time near the event.

19. The method of claim 13, wherein performing processing associated with outputting the annotated malware path comprises automatically labeling at least one node within the sequence.

20. The method of claim 19, wherein performing processing associated with outputting the annotated malware path further comprises adding each node to the annotated malware path.

21. The method of claim 13, wherein performing processing associated with tracing the sequence of network transactions comprises analyzing at least one of the following features of at least two nodes of the network traffic:
location;
referrer;
domain in uniform resource identifier;
uniform resource identifier in content;
same domain;
commonly exploitable content; and
same effective second level domains.

22. The method of claim 13, further comprising:
performing processing associated with receiving, with a malware download defense module in communication with the processor, the annotated malware path; and
performing processing associated with creating, with the malware download defense module, a countermeasure based on statistical data in the annotated malware path.

23. The method of claim 22, wherein performing processing associated with creating the countermeasure comprises identifying a landing node, an injection node, and an exploit node for an event within the annotated malware path, wherein the event is caused by a drive-by download.

24. The method of claim 22, wherein performing processing associated with creating the countermeasure comprises generating a report for display, the report comprising at least a portion of the annotated malware path.

25. The method of claim 22, further comprising performing processing associated with training, with the malware download defense module, a new malware download defense module based on the created countermeasure.

* * * * *